United States Patent [19]
Saiki et al.

[11] Patent Number: 5,461,518
[45] Date of Patent: Oct. 24, 1995

[54] CASSETTE AUTOCHANGER HAVING A PLURAL SPEED TRANSFER MECHANISM

[75] Inventors: Junichi Saiki; Akira Iseki, both of Kanagawa, Japan

[73] Assignee: Sony Corporation, Tokyo, Japan

[21] Appl. No.: 276,810

[22] Filed: Jul. 18, 1994

[30] Foreign Application Priority Data

Jul. 23, 1993 [JP] Japan .................................. 5-202112

[51] Int. Cl.⁶ .................................................. G11B 15/18
[52] U.S. Cl. .................................. 360/69; 360/92; 360/71
[58] Field of Search ........................... 360/69, 71, 73.01, 360/81, 83, 88, 90, 91, 92, 93, 98.04, 98.05, 99.02, 99.06; 369/33, 34, 35, 36, 75.1, 77.1; 414/280, 277; 364/478

[56] References Cited

U.S. PATENT DOCUMENTS 4,779,151  10/1988  Lind et al. ............................ 360/69 X
4,979,057  12/1990  Matsumoto et al. ................. 360/69 X Primary Examiner—Andrew L. Sniezek
Attorney, Agent, or Firm—William S. Frommer; Alvin Sinderbrand

[57] ABSTRACT

A cassette autochanger capable of lowering a load on a cassette and a cassette transfer mechanism of a transfer machine when the cassette is supplied to and received from a recording and/or reproducing apparatus, such as a data recorder, by the cassette transfer mechanism. In a normal condition, the cassette is fed from the transfer machine to the data recorder in a low-speed transfer mode. When a power failure takes place after the start of a cassette feeding operation, the cassette is thereafter fed in a high-speed transfer mode.

6 Claims, 42 Drawing Sheets

| | S1 | S2 | S3 | |
|---|---|---|---|---|
| 1 | | | 1 | |
| 2 | | 1 | 1 | |
| 3 | 1 | 1 | 1 | ← CONDITION "1" |
| 4 | 1 | 1 | | ← CONDITION "2" |
| 5 | 1 | | | |

|   | S1 | S2 | S3 |    |
|---|----|----|----|-----|
| 1 | 1  |    |    |    |
| 2 | 1  | 1  |    |    |
| 3 | 1  | 1  | 1  | ← CONDITION "1" |
| 4 |    | 1  | 1  | ← CONDITION "2" |
| 5 |    |    | 1  |    |

CASSETTE AUTOCHANGER HAVING A PLURAL SPEED TRANSFER MECHANISM

BACKGROUND OF THE INVENTION

1. Field of the Invention

The present invention relates to a cassette autochanger for automatically changing various cassettes each storing therein a recording medium, such as a tape or a disk, to enable a continuous recording and/or reproducing of the cassette for a long period of time.

2. Description of the Related Art

A cassette autochanger for use in a television broadcasting station is known, which automatically changes tape cassettes relative to video tape recorders (hereinafter referred to as "VTRs") for continuously recording and/or reproducing data on a recording medium stored in each of the tape cassettes. More specifically, the known cassette autochanger includes a transfer machine disposed between a plurality of storage shelves holding therein a plurality of tape cassettes, and a plurality of VTRs constituting recording and reproducing apparatuses. A tape cassette is selectively taken out from one of the storage shelves and subsequently transferred to one of the VTRs by means of the transfer machine. The thus transferred tape cassette is then injected into the VTR and after that recording and/or reproducing operation is started. On the other hand, a tape cassette, ejected from the VTR after the completion of recording and/or reproducing operation, is transferred to and then stored in its original storage shelf by the means of the transfer machine. The foregoing operation is repeated to continue the recording and/or reproducing operation for a long period of time.

In the known cassette autochanger, when a power failure signal is detected before the cassette is fed out from the transfer machine to a VTR, the cassette feed-out or supplying operation is interrupted. On the other hand, when the power failure signal is detected after the start of the cassette feed-out operation, the cassette feed-out operation further proceeds to without interruption. Conventionally, due to the necessity of completing the cassette feed-out operation while a power supply is backed up, it is not possible to lower the cassette transfer speed. The tape cassette is, therefore, transferred at a high speed at all times.

In the conventional high-speed cassette transfer system, the cassette transfer mechanism and the tape cassette are subjected to undue load or pressure and hence the reliability and durability of these components are relatively low. In addition, the tape cassette while being transferred at a high speed is likely to produce fine particles of plastic or metal which might cause a dropout during the recording and/or reproducing operation.

In view of the foregoing drawbacks of the prior art, it is an object of the present invention to provide a cassette autochanger which is capable of lowering a load on a cassette transfer mechanism and a cassette transferred thereby when the cassette is transferred from the cassette transfer mechanism of a transfer machine into a recording and/or reproducing apparatus.

SUMMARY OF THE INVENTION

According to the present invention, there is provided a cassette autochanger for automatically supplying and selectively reproducing a plurality of cassettes having signals recorded on recording mediums thereof, the cassette autochanger comprising: a plurality of storage portions each storing therein one of the cassettes; a plurality of recording and/or reproducing apparatuses; a transfer machine for selectively transferring the cassettes between the storage portions and the recording and/or reproducing apparatuses, the transfer machine having a transfer mechanism for feeding out the cassettes to the recording and/or reproducing apparatuses; and control means for controlling the operation of the transfer mechanism so that in a normal condition, the cassettes are fed at a first speed, and when a power failure occurs after the feeding of the cassettes is started, the cassettes are thereafter fed at a second speed higher than the first speed.

The control means may include means for detecting the occurrence of a power failure. According to a preferred embodiment, the cassette autochanger may further include a sensor for detecting the arrival of the cassettes at a predetermined position when the cassette are fed toward the recording and/or reproducing apparatuses by the transfer machine. In this instance, the control means controls the operation of the transfer mechanism such that the cassettes are fed toward the recording and/or reproducing apparatuses at the second speed when a power failure is detected by the detecting means after a detected output from the sensor is obtained.

Preferably, the sensor comprises a sensor capable of detecting the cassette when the cassette protrudes from a surface of the transfer machine confronting to the recording and/or reproducing apparatuses. The transfer mechanism preferably includes an endless conveyor belt and a motor for running the conveyor belt, and the control means controls the speed of rotation of the motor. The transfer mechanism may further include a presser roller for forcing the cassette against the conveyor belt.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE INVENTION

A cassette autochanger embodying the present invention will be described below in greater detail with reference to the accompanying drawings. The cassette autochanger is so constructed as to automatically change tape cassettes (hereinafter referred to as "cassettes") with respect to a recording and/or reproducing apparatus composed of a plurality of data recorders (hereinafter referred to as "DIRs").

General Construction Of Cassette Autochanger

Figure 1:
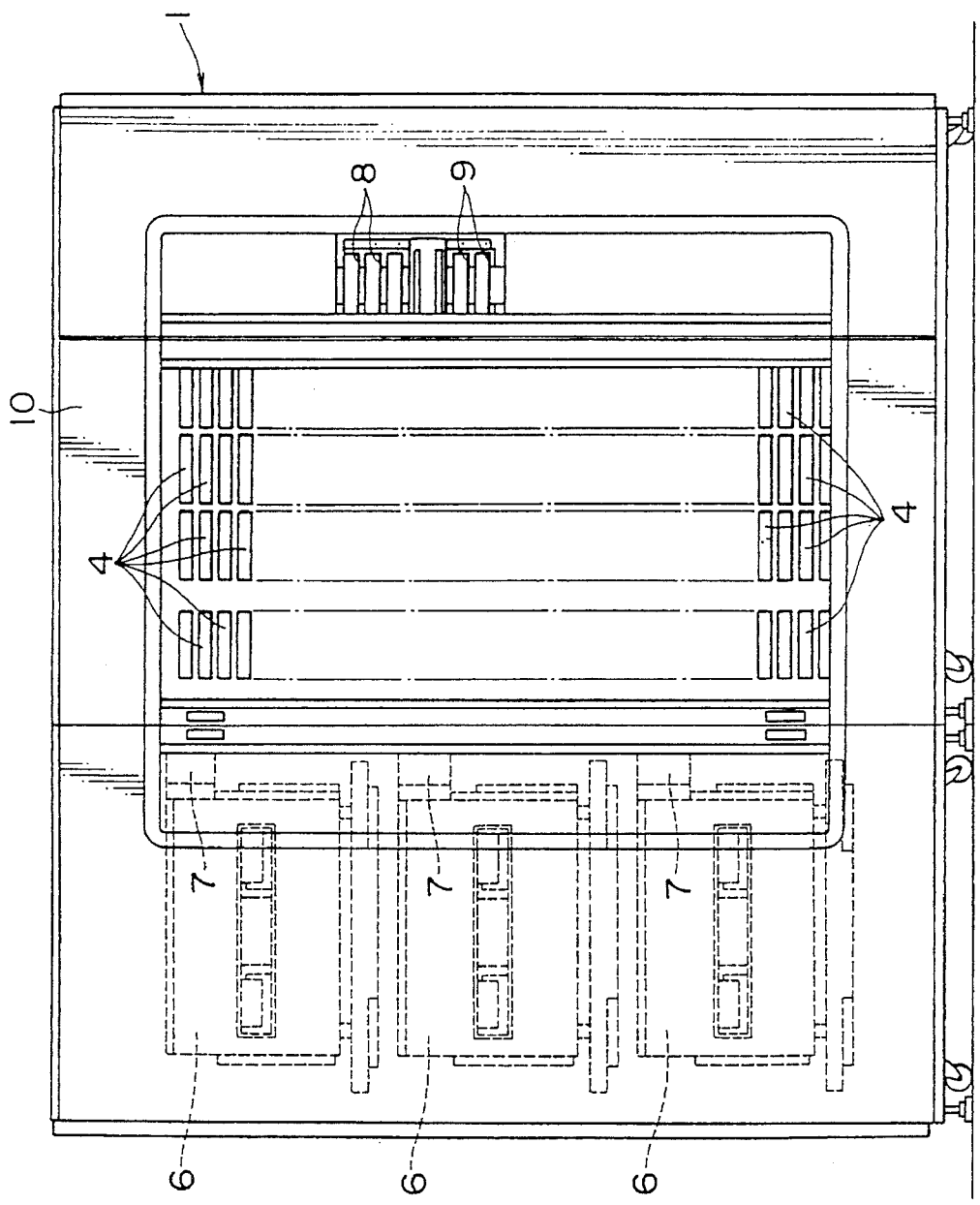
FIG. 1 is a front elevational view showing the general construction of a cassette autochanger according to an embodiment of the present invention.
Figure 2:
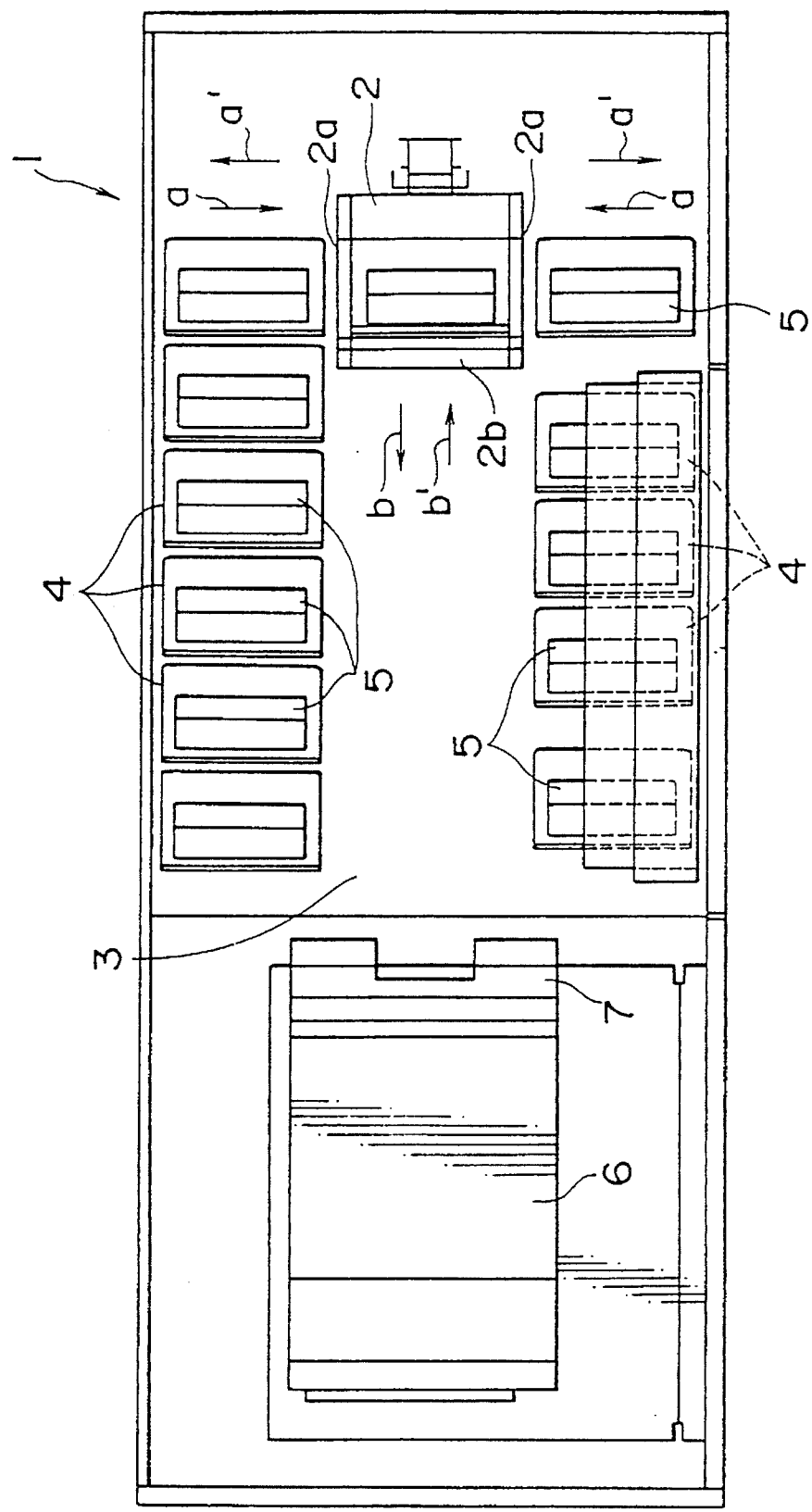
FIG. 2 is a diagrammatical plan view of FIG. 1.

Firstly, the general construction of the cassette autochanger will be described with reference to FIGS. 1 and 2.

The cassette autochanger includes a autochanger body 1 having, defined therein, an elevator traveling passage 3 provided centrally in the autochanger body 1 for movement of an elevator 2. The elevator 2 constitutes a transfer machine of the cassette autochanger. On each of the front and back sides of the elevator traveling passage 3, there are disposed a number of storage shelves 4 arranged in horizontal rows and vertical columns. Each of the storage shelves 4 horizontally supports thereon one cassette 5. At one side (the left-hand side in FIGS. 1 and 2) of the elevator traveling passage 3, there is provided a plurality of DIRs 6 stacked one above another with their front faces directed toward the elevator 2. An adapter 7 is attached to the front face of each of the DIRs 6 for handling (supplying and receiving) the cassette 5 with respect to the associated DIR 6.

The elevator 2 is fed at a high speed along the elevator traveling passage 3 in an X direction (vertical direction in FIG. 1) and a Y direction (horizontal direction in FIGS. 1 and 2) by means of a high speed positioning feed mechanism (not shown). The elevator 2 can be stopped at any desired position in the X or Y direction and positioned in the desired position.

The elevator 2 has a pair of cassette entrances 2a, 2a at left and right sides thereof for supplying and receiving therethrough the cassette 5 relative to each of the storage shelf 4 in the directions indicated by the arrows a and a'. The elevator 2 further has a cassette entrance 2b formed in its front side facing the DIRs 6 for supplying and receiving the cassette 5 relative to each of the adapters 7 in the directions indicated by the arrows b and b'.

Cassette Loading Operation

To load a number of cassettes 5 into the corresponding number of storage shelves 4 of the cassette autochanger, the operator inserts the cassettes 5 one after another into inlet ports 8 formed in a front face of the autochanger body 1. Upon insertion of the individual cassettes 5, the elevator 2 operates, under the control of a command from a host controller (described later), to take out the inserted cassettes 5 one by one and then transfer them to specified storage shelves 4 for setting or loading the cassettes 5 in the corresponding storage shelves 4.

Automatic Cassette Changing Operation

The automatic cassette changing operation of the cassette autochanger is achieved under the control of the host controller in such a manner that the cassette 5 in a designated storage shelf 4 is taken out by the elevator 2, then transferred by the latter to a designated DIR 6, and thereafter automatically injected by the adapter 7 into the designated DIR 6 which in turn performs recording and/or reproducing operation of the cassette 5. On the other hand, a cassette 5 which has been recorded and/or reproduced in another DIR 6 is ejected by the associated adapter 7 into the elevator 2 which in turn transfers the cassette 5 for returning the same to its original position on the corresponding storage shelf 4. Thus, by repeating the foregoing sequence of operations, the cassette autochanger is able to continuously record and/or reproduce data for a long period of time.

The autochanger body 1 has a plurality of outlet ports 9 formed in the front face at a position below the input ports 8. The front face of the autochanger body 1 further has a door 10 partly formed with a transparent window.

Adapter Attachment Structure

Figure 3:
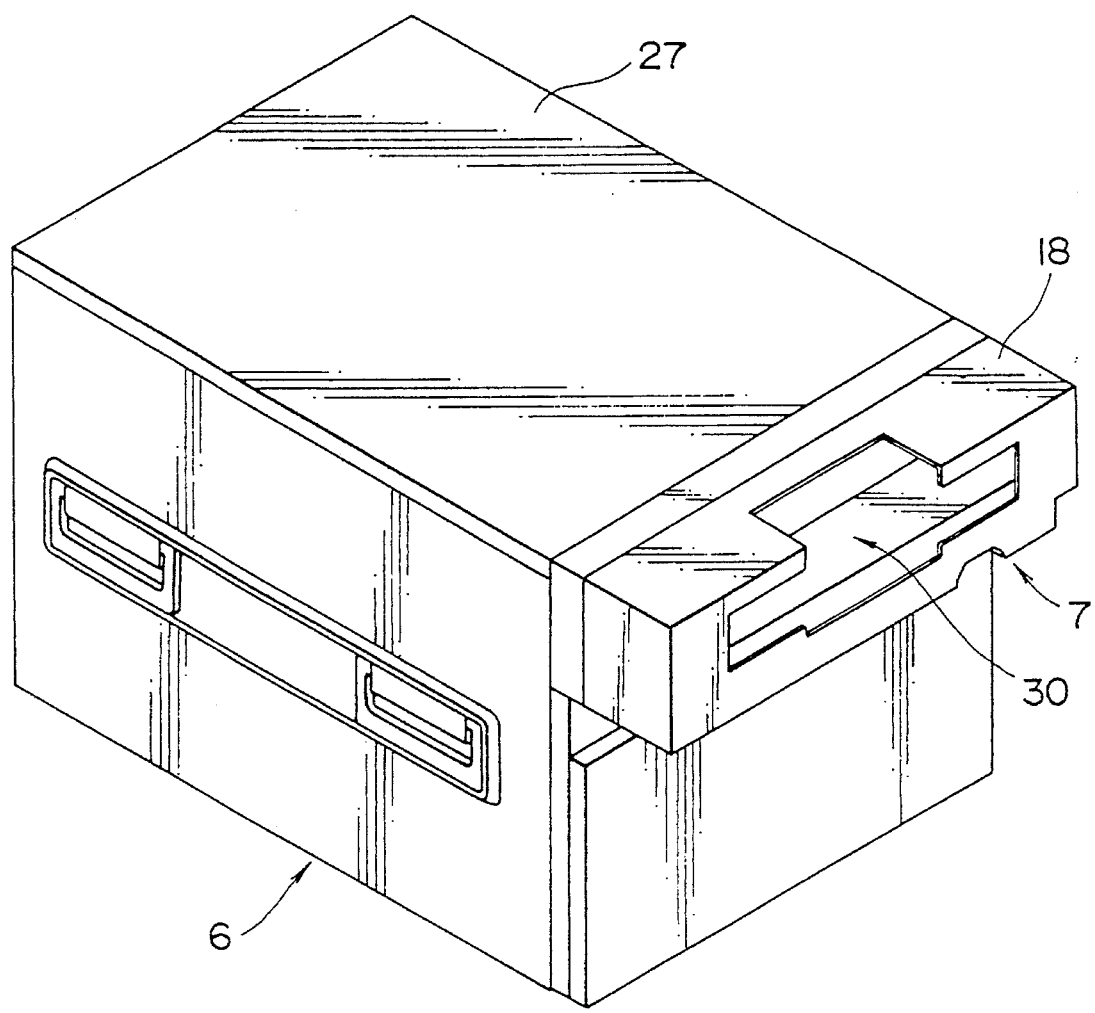
FIG. 3 is a perspective view showing a data recorder and an adapter of the cassette autochanger.

A structure to attach the adapter 7 to the corresponding DIR 6 will be described below with reference to FIGS. 3 and 4.

Figure 4:
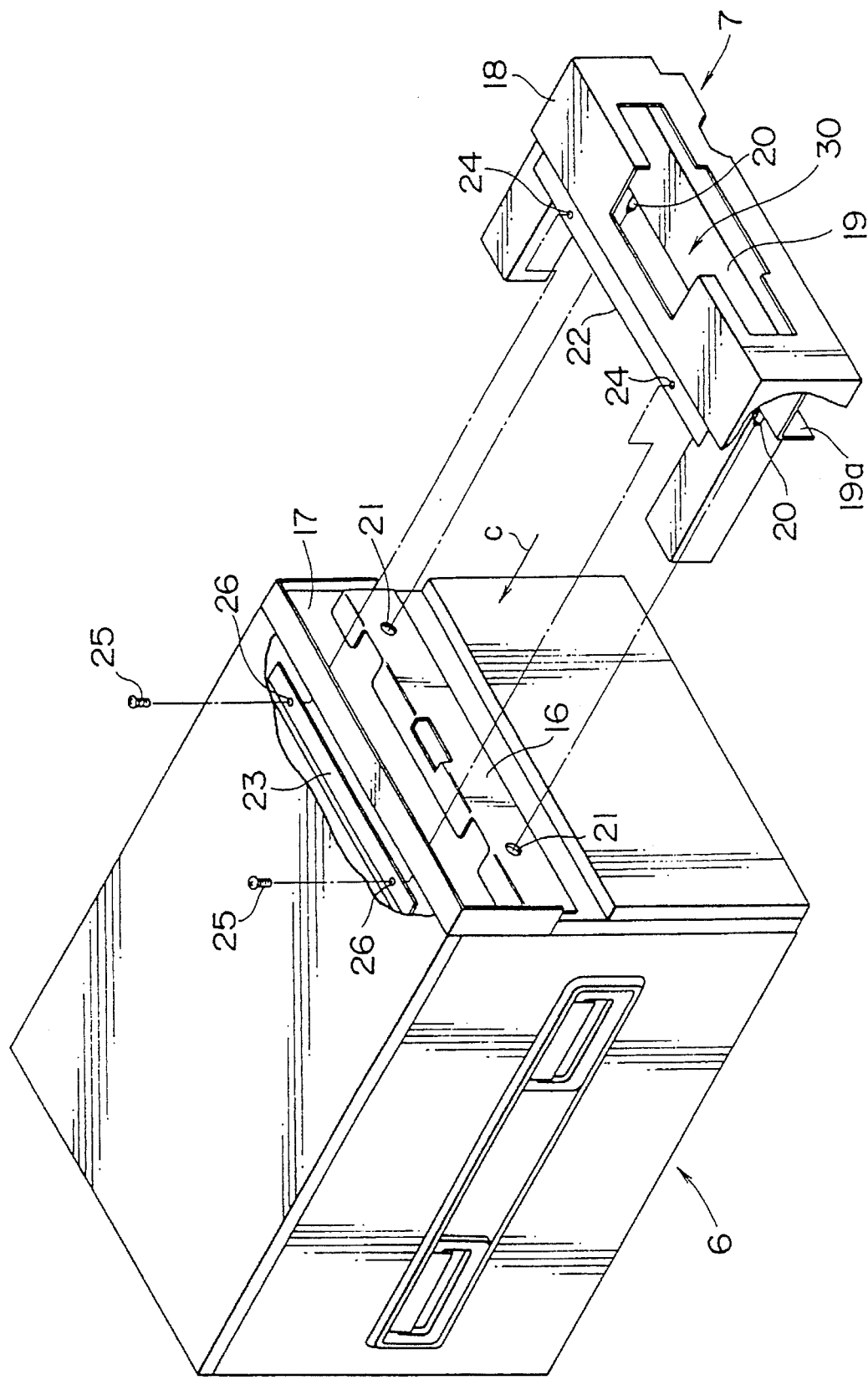
FIG. 4 is an exploded perspective view, with parts cutaway for clarity, showing an attachment structure of the adapter relative to data recorder.

As shown in FIG. 4, the front penal of each DIR 6 is removed so that a cassette compartment attachment plate 16 is exposed to the front side of the DIR 6, with an opening 17 defined above the cassette compartment attachment plate 16. The cassette compartment attachment plate 16 forms a cassette compartment 15 (FIG. 5) within the DIR 6.

The backside of a body 18 of the adapter 7 is inserted into the opening 17 from a direction indicated by the arrow c until a pair of attachment reference pins 20, 20 on a vertical back plate 19a of a horizontal adapter stage 19 of the adapter body 18 are inserted in the direction of the arrow c into a pair of attachment reference holes 21, 21 in the cassette compartment attachment plate 16. Thus, the back plate 19a and a front surface of the horizontal cassette compartment attachment plate 16 are held in abutment with each other by the action of gravity or weight of the adapter 7, as indicated by the arrow c. In this instance, a horizontal attachment plate 22 formed at an upper portion of the backside of the adapter body 18 is placed on a horizontal attachment plate 23 on the cassette compartment side, while a pair of through-holes 24 in the attachment plate 22 and a pair of tapped or threaded holes 26 in the attachment plate 23 are vertically aligned with each other. Two set screws 25 pass through the through-holes 24 and are threaded into the threaded holes 26 to secure the two attachment plates 22, 23. Finally, as shown in FIG. 3, a top plate 27 of the DIR 6 is attached to a body of the DIR 6 to conceal the set screw 25. The adapter 7 is thus attached to the DIR 6.

With the adapter 7 thus attached directly to the cassette compartment attachment plate 16 in the DIR 6, the attachment accuracy of the adapter 7 relative to the cassette compartment 15 is rendered stable and hence is able to improve the reliability of the access when the cassette 5 is injected into and ejected from the cassette compartment 15 in the DIR 6 via the adapter 7.

Cassette Transfer Mechanism in Adapter

A cassette transfer mechanism in the adapter 7 will be described below with reference to FIGS. 5 through 15.

Figure 5:
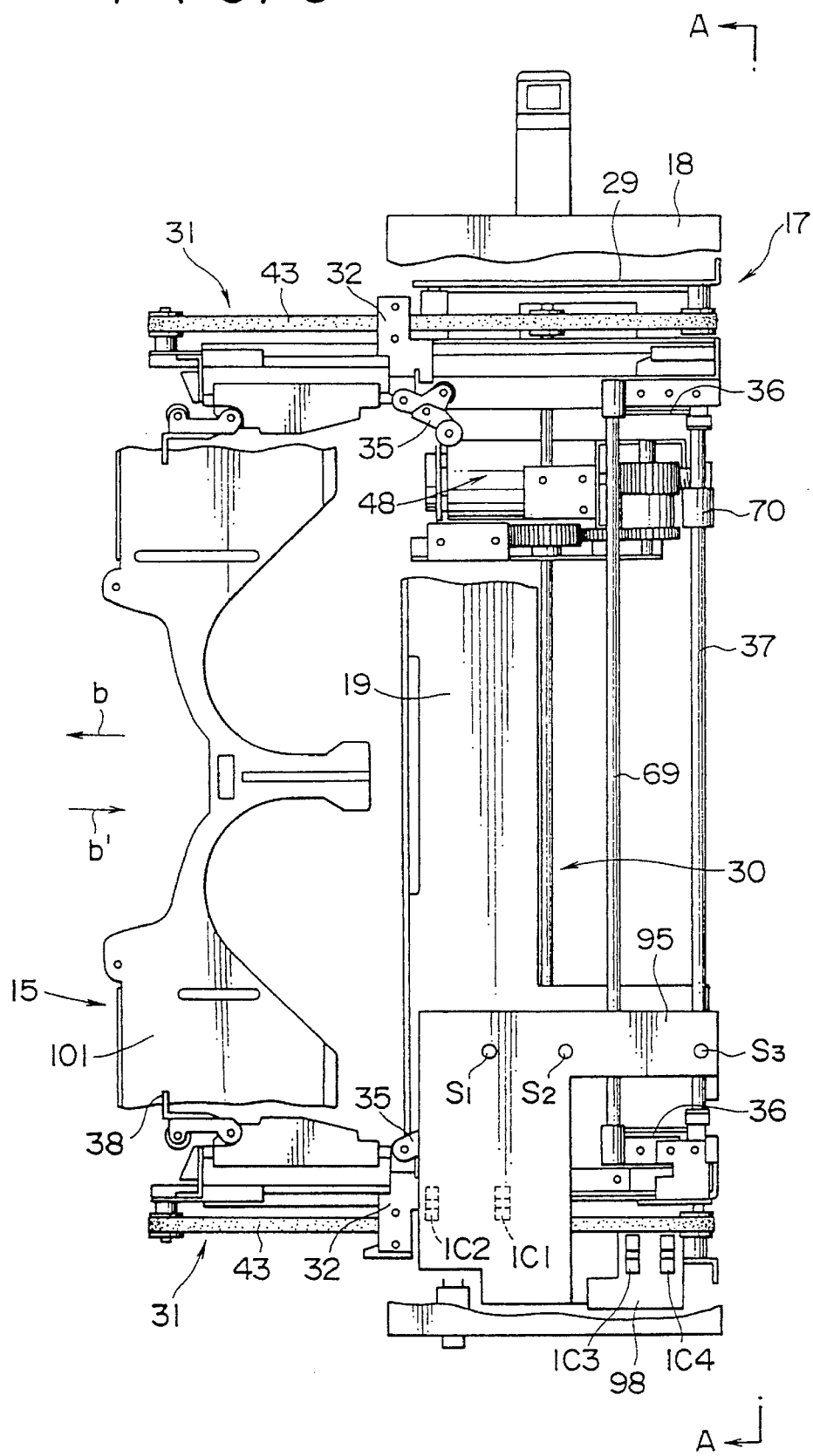
FIG. 5 is a plan view, with parts cutaway for clarity, of the adapter of the cassette autochanger.
Figure 6:
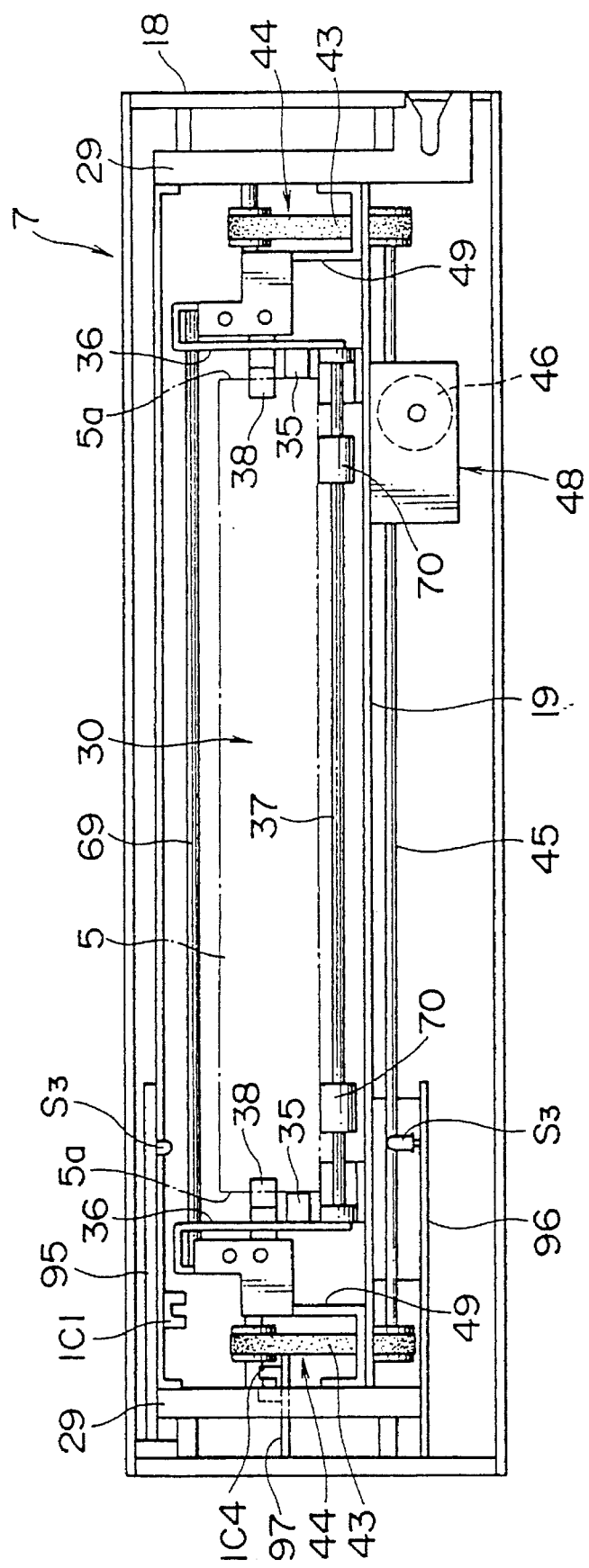
FIG. 6 is a view in the direction of the arrow A—A in FIG. 5.
Figure 7:
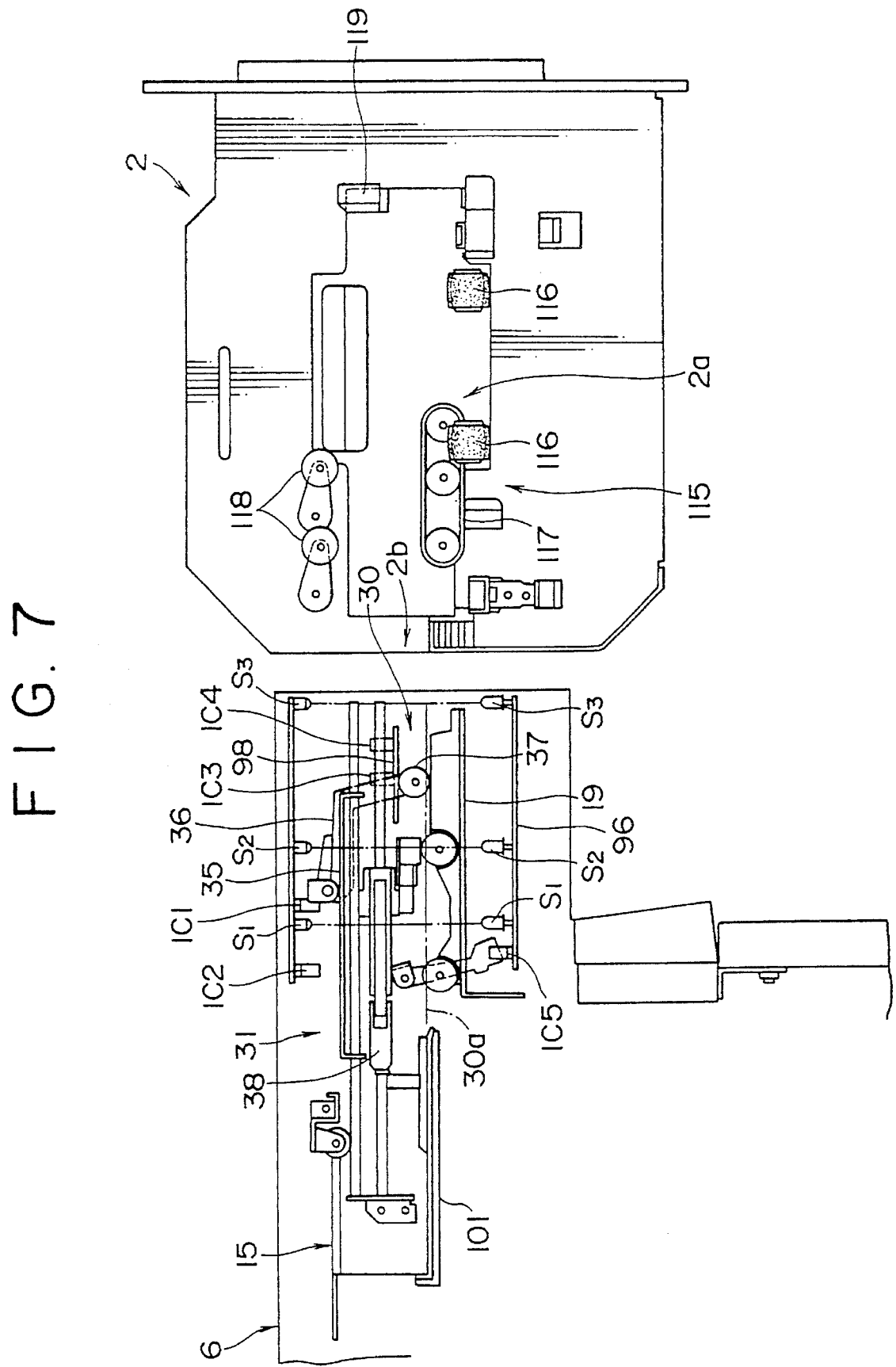
FIG. 7 is a side view, with parts cutaway for clarity, of the adapter and an elevator.

As shown in FIGS. 5–7, the adapter stage 19 is disposed horizontally between left and right vertical side plates 29, 29 in the adapter body 18. A cassette feed passage 30 is formed horizontally along an upper central portion of the adapter stage 19 for handing the cassette 5 in the directions indicated by the arrows b and b' between the elevator 2 and the cassette component 15 in the DIR 6. A cassette transfer mechanism 31 is arranged in bilateral symmetry on left and right sides of the cassette feed passage 30.

The cassette transfer mechanism 31 generally comprises a pair of first sliders 32, a pair of second sliders 33 (FIG. 12) and a pair of third sliders 34 (FIG. 14) that are disposed in bilateral symmetry on opposite sides of the cassette feed passage 30 and movable in directly opposite access directions, namely in the inject direction (indicated by the arrow b) and in the eject direction (indicated by the arrow b'), along the cassette feed passage 30. The cassette transfer mechanism 31 further includes a pair of bilaterally symmetrical side arms 35 attached to the first sliders 32, respectively, for movement in unison with the first sliders 32 in the directions of the arrows b, b', a pair of bilaterally symmetrical inject arms 36 attached to the second sliders 33, respectively, for movement in unison with the second sliders 33 in the directions of the arrows b, b', an inject bar 37 horizontally extending between the inject arms 36, a pair of bilaterally symmetrical eject arms 38 attached to the third sliders 34, respectively, for movement in unison with the third sliders 34 in the direction of the arrows b, b', and a drive mechanism 39 (FIG. 8) arranged in bilateral symmetry for driving the first sliders 32 in the direction of the arrows b, b'.

Figure 8:
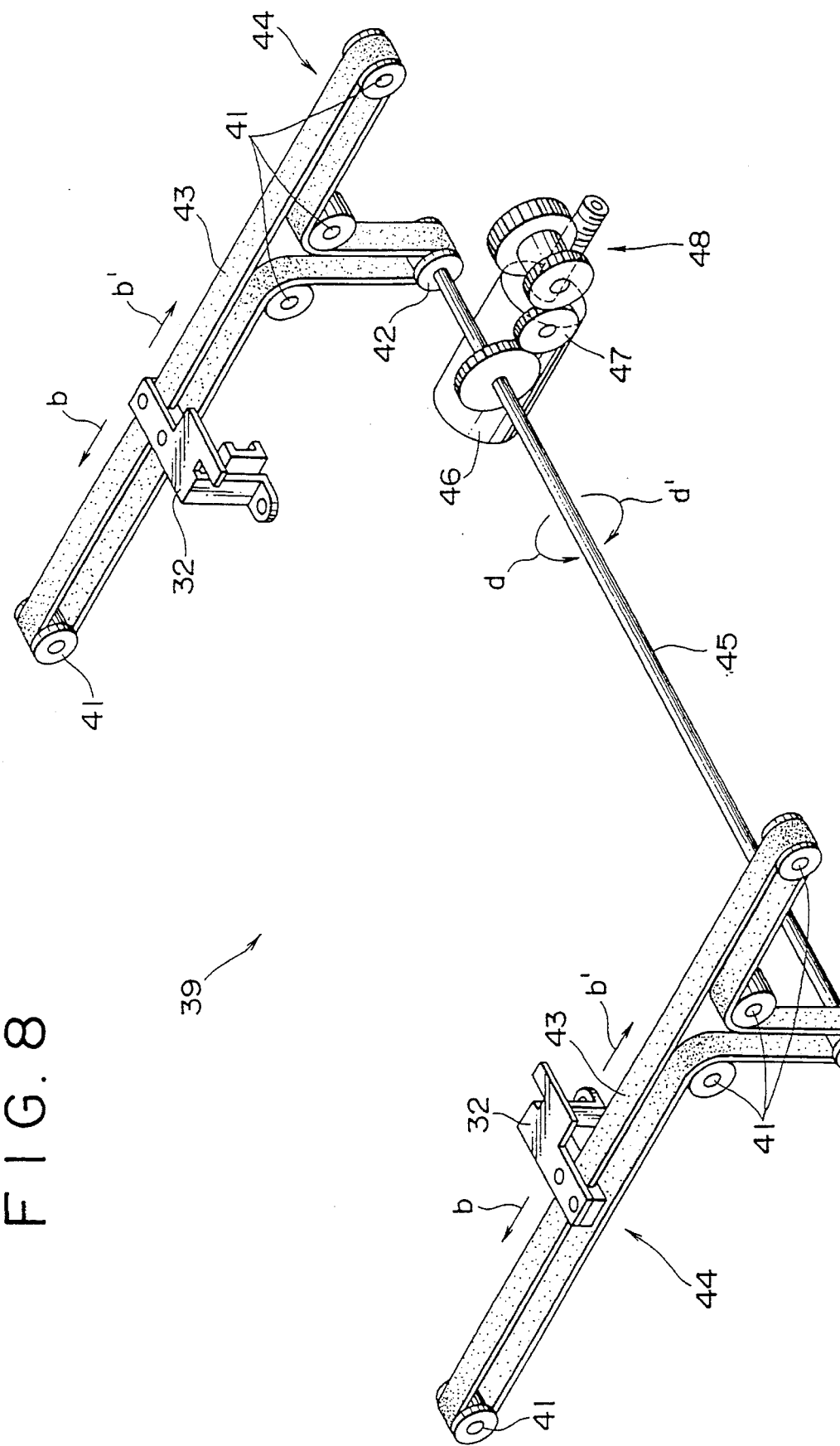
FIG. 8 is a perspective view showing a drive mechanism in the adapter shown in FIG. 7.

As shown in FIG. 8, the drive mechanism 39 is composed of a pair of bilaterally symmetrical belt-drive mechanisms 44 each including four guide pulleys 41, a drive pulley 42, and an endless timing belt 43 trained around the pulleys 41, 42 to profile a substantially T shape, a horizontal drive shaft 45 extending perpendicularly to the directions of the arrows b, b' and interconnecting the drive pulleys 42, and a geared motor 48 including a motor 46 for rotatably driving the horizontal drive shaft 45 via a gear train 47.

Each of the first sliders 32 is attached to a part of an upper horizontal portion of a corresponding one of the substantially timing belts 43. With this arrangement, when the geared motor 48 is driven to rotate the drive shaft 45 in the forward and reverse directions indicated by the arrows d, d', the timing belts 43 are simultaneously driven in the directions of the arrows b, b' to horizontally reciprocate the first sliders 32 simultaneously in the same direction as the timing belts 43.

As shown in FIGS. 5 and 6, the left and right belt-drive mechanisms 44 of the drive mechanism 39 are disposed in parallel spaced relation with each other and located on the outside of a pair of parallel spaced vertical guide rail attachment plates 49. The vertical guide rail attachment plates 49 are disposed on opposite sides of the cassette feed passage 30 and extend parallel to the directions of the arrows b, b'. The drive shaft 45 and the geared motor 48 are horizontally mounted on the underside of the adapter stage 19.

Figure 9:
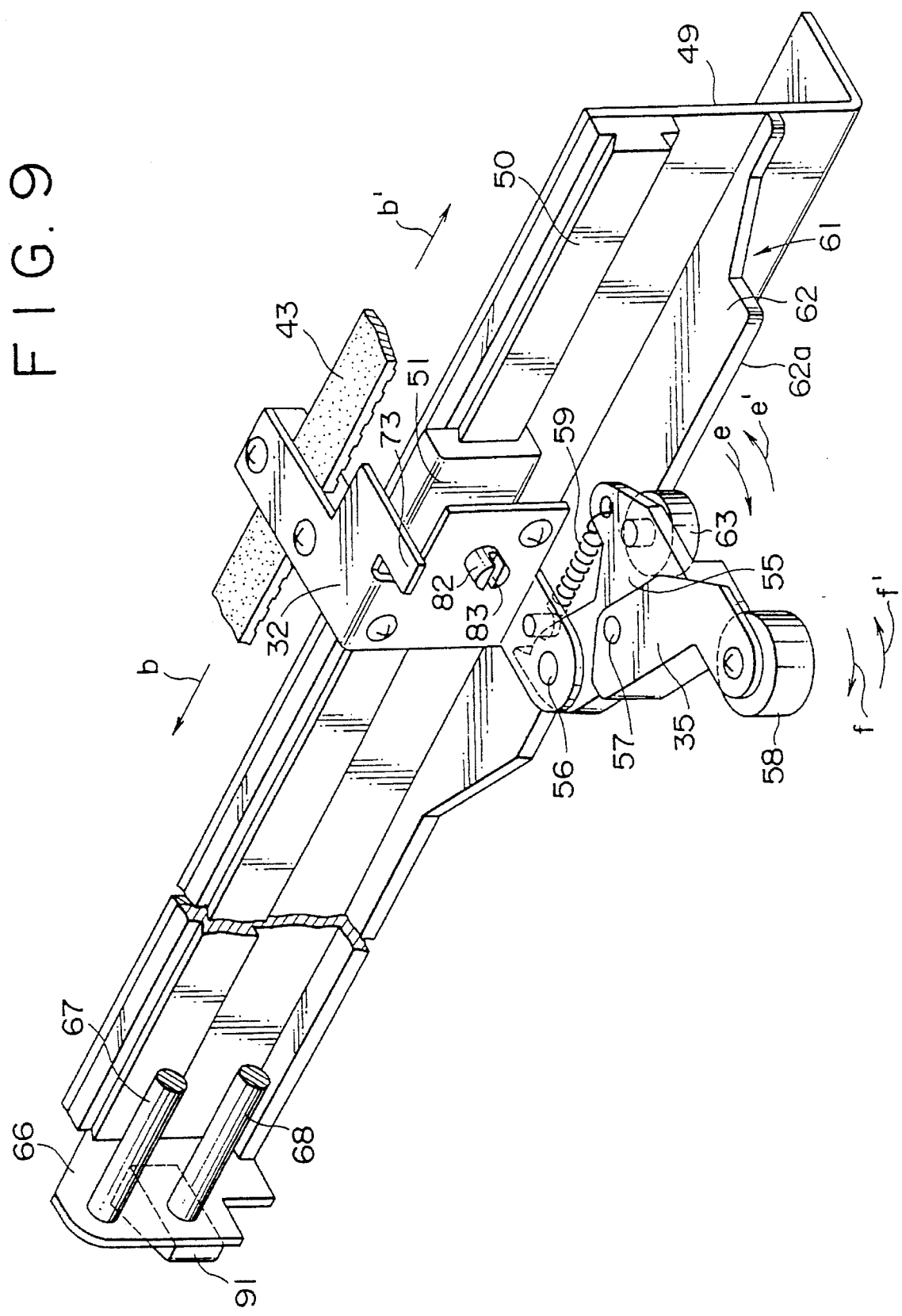
FIG. 9 is a perspective view showing a first slider and a side arm of the drive mechanism shown in FIG. 8.

As shown in FIG. 9, a horizontal guide rail 50 is attached to the inside surface of each of the guide rail attachment plates 40 (only the right side attachment plate being shown) and extends in a direction parallel to the directions of the arrows b, b'. A slider member 51 is attached to each of the first sliders 32 and slidably mounted on the guide rail 50 via a dovetail fitting. The first slider 32 thus guided by the guide rail 50 is reciprocally slidable in the directions of the arrows b, b'.

Figure 10:
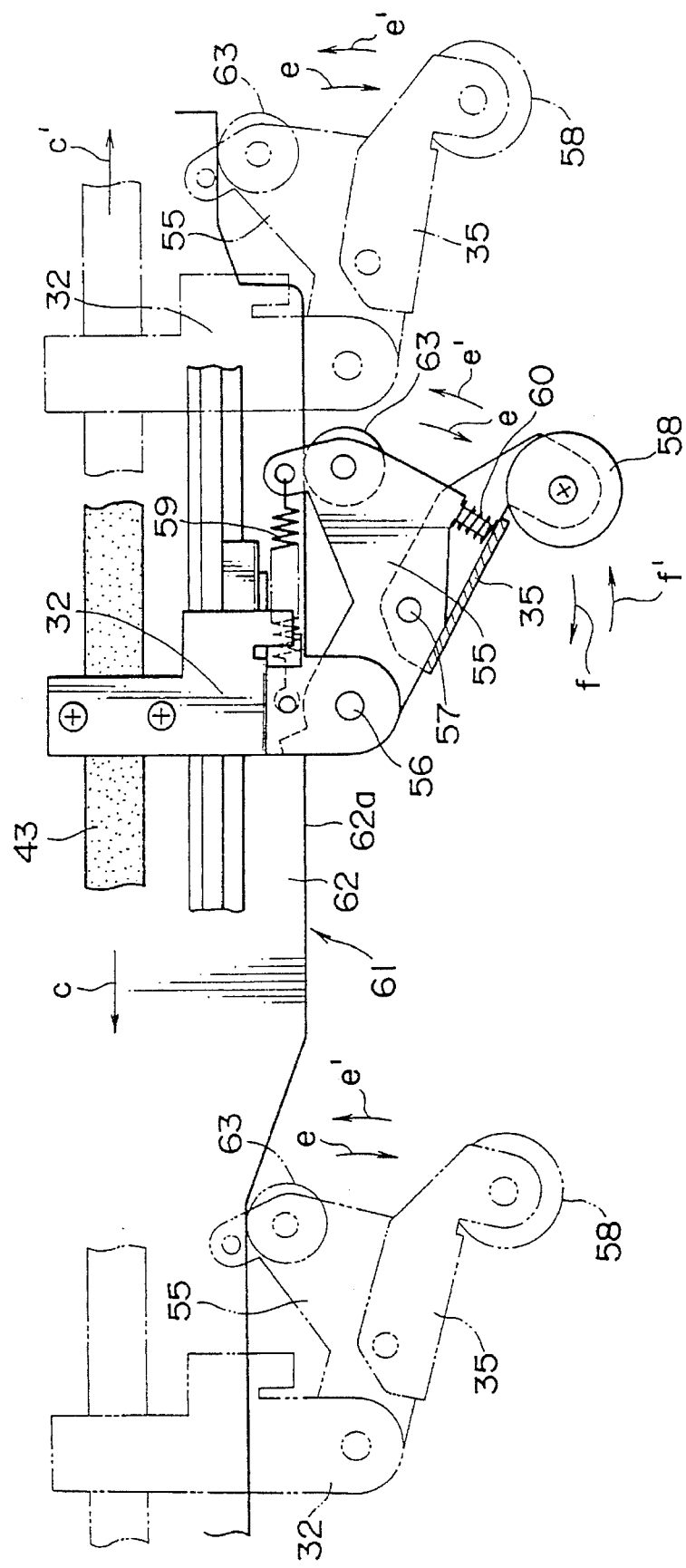
FIG. 10 is a plan view, with parts cutaway for clarity, of FIG. 9.

As shown in FIGS. 9 and 10, a side arm attachment plate 55 is rotatably mounted on a lower end of the inside surface of each first slider 32 via a vertical pivot shaft 56 and pivotally movable about the pivot shaft 56 in the directions indicated by the arrows e, e'. To the side arm attachment plate 55 is rotatably mounted via a vertical pivot shaft 57 a corresponding one of the side arms 35. The side arm 35 thus attached is pivotally movable about the pivot shaft 57 in the directions of the arrows f, f'. The side arm 35 has a free end projecting inwardly of the first slider 32, and a cassette presser roller 58 made of rubber, for example, is non-rotatably mounted on the free end of the side arm 35.

A tension coil spring 59 extends between each of the first sliders 32 and the corresponding side arm attachment plate 55 and urges the latter to turn in the direction of the arrow e'. A compression coil spring 60 (FIG. 10) acts between each of the side arm attachment plates 55 and the corresponding side arm 35 and urges the latter to turn in the direction of the arrow f within a predetermined angular range.

Each of the side arms 35 is turned by the action of a first cam mechanism 61 in the directions of the arrows e, e' to move toward and away from a corresponding one of the and right side surfaces 5a (FIG. 6) of the cassette 5. The cam mechanism 61 is composed of a cam plate 62 horizontally attached to the inside surface of the guide rail attachment plate 49 and having an inwardly projecting portion 62a, a cam follower roller 63 mounted on an outer side of an free end of the side arm attachment plate 55 for rolling engagement with the cam plate 62, and the tension coil spring 59 described above. By the force of the tension coil spring 59, the cam follower roller 63 is normally urged in the direction of the arrow e' and hence is held in rolling engagement with the cam plate 62.

With this construction, each of the side arms 35 and the corresponding first slider 32 are horizontally and simultaneously movable in the directions of the arrows b, b'. In the course of its movement in the directions of the arrows b, b', the cam follower roller 63 rides on the inwardly projecting portion 62a of the cam plate 62 against the force of the tension coil spring 59. Thus, the side arm 35 is displaced in the direction of the arrow e from the non-pressing position in which the side arm 35 is retracted from the cassette feed passage 30 as indicated by the dot-and-dash and-dash lines and two-dot-and-dash lines shown in FIG. 10, to a pressing position in which the side arm 35 projects into the cassette feed passage 30 as indicated by the solid lines shown in FIG. 10. The side arm 35 while keeping its pressing position is reciprocally movable in the directions of the arrows b, b' by a predetermined distance which is substantially equal to the length of the inwardly projecting portion 62a of the cam plate 62.

When the side arm 35 is forcibly displaced in the direction of the arrow e to the solid-lined pressing position of FIG. 10, the presser roller 58 is forced against a corresponding one of the left and right side surfaces 5a of the cassette 5 against the force of the compression coil spring 60 in a manner described later.

Figure 12:
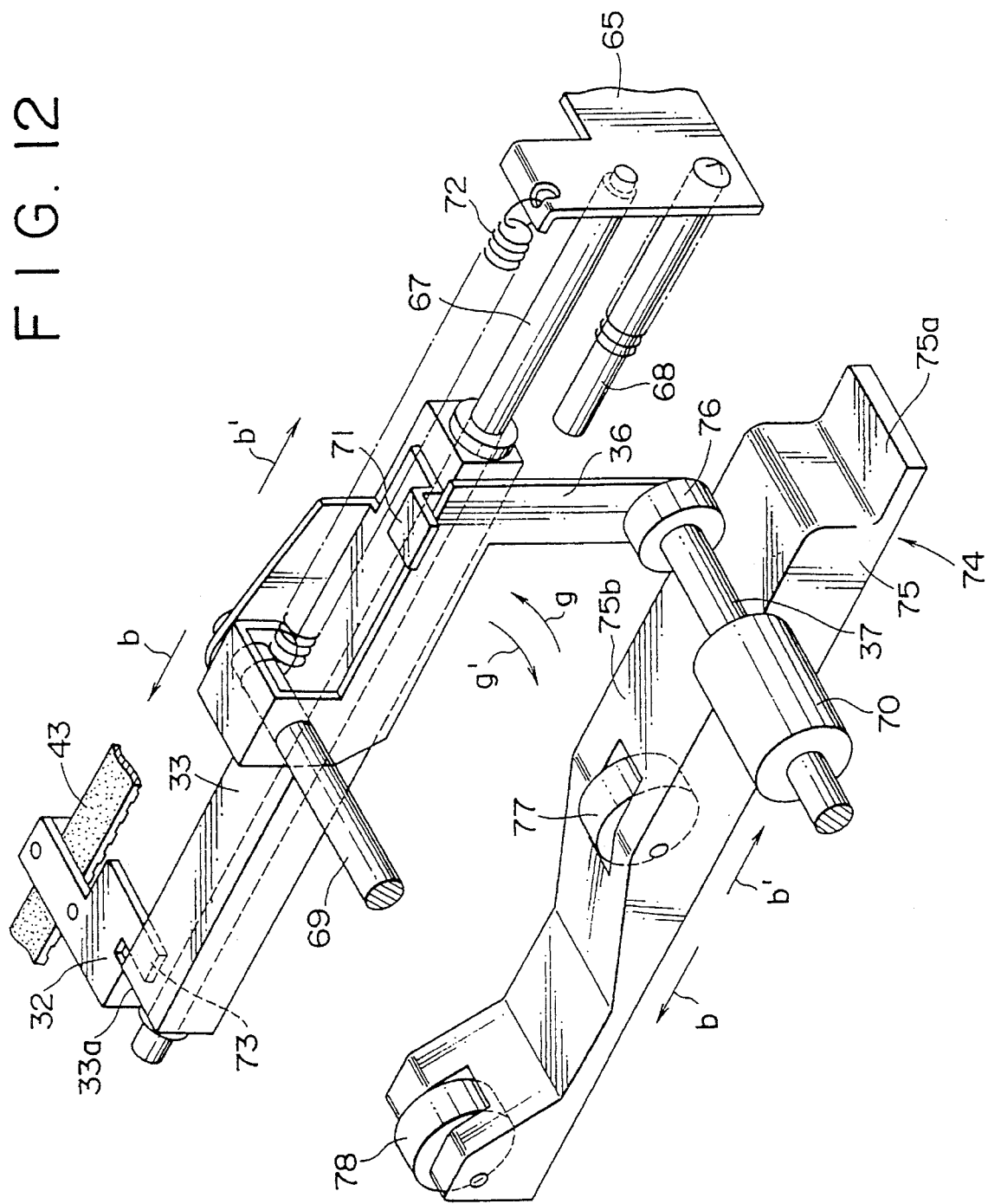
FIG. 12 is a perspective view showing a second cam mechanism for controlling the inject arm of FIG. 11.
Figure 14:
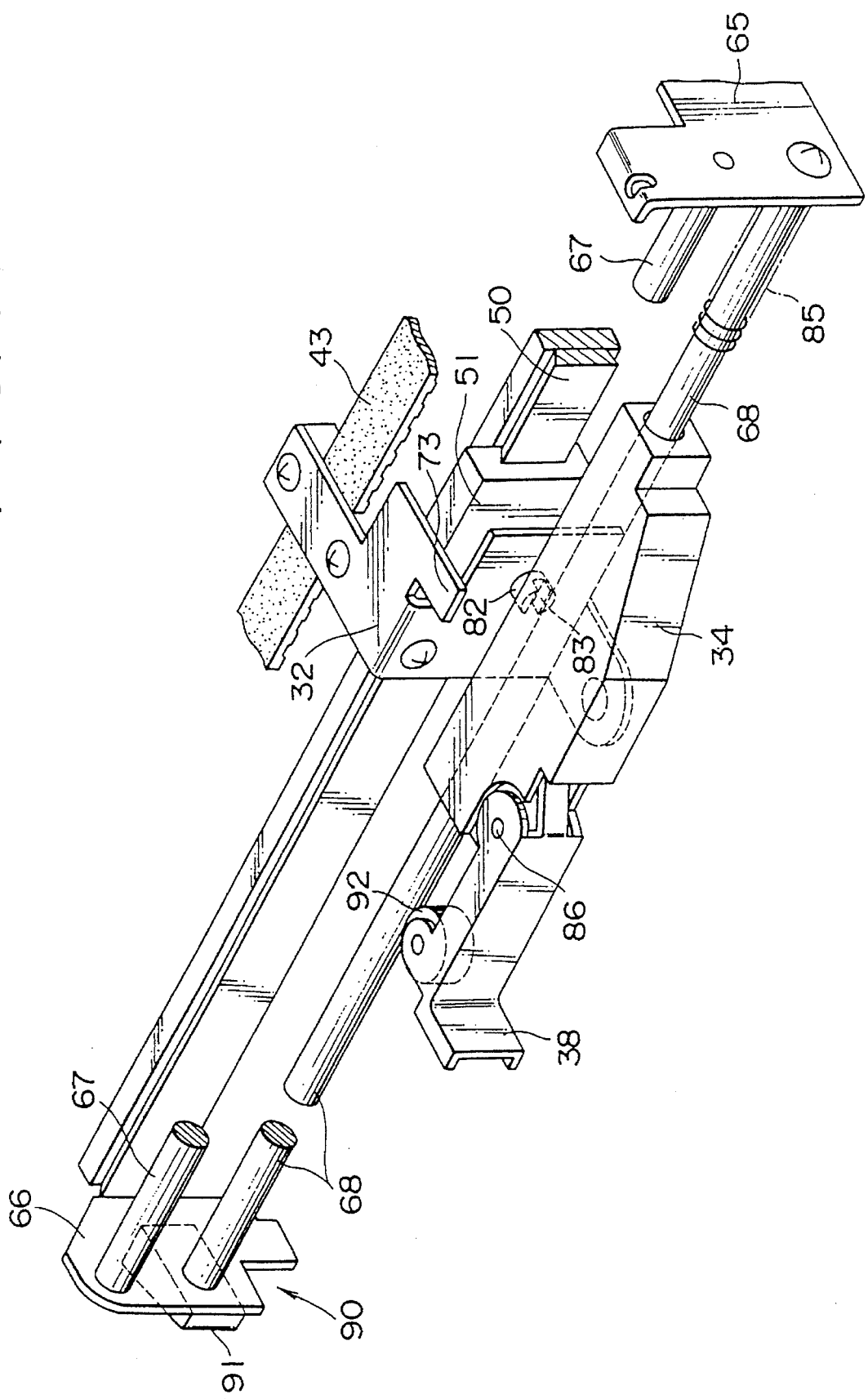
FIG. 14 is a perspective view showing the inject art in the adapter.

As shown in FIGS. 9, 12 and 14, a pair of guide shaft attachment plates 65, 66 are attached to opposite ends of each of the guide rail attachment plates 49. The guide shaft attachment plates 65, 66 are located above a path of movement of the side arm 35. A pair of parallel, vertically spaced guide shafts 67 and 69 extends between the guide shaft attachment plates 65, 66 in parallel, laterally spaced relation to the guide rail 50 on the guide rail attachment plate 49.

Figure 11:
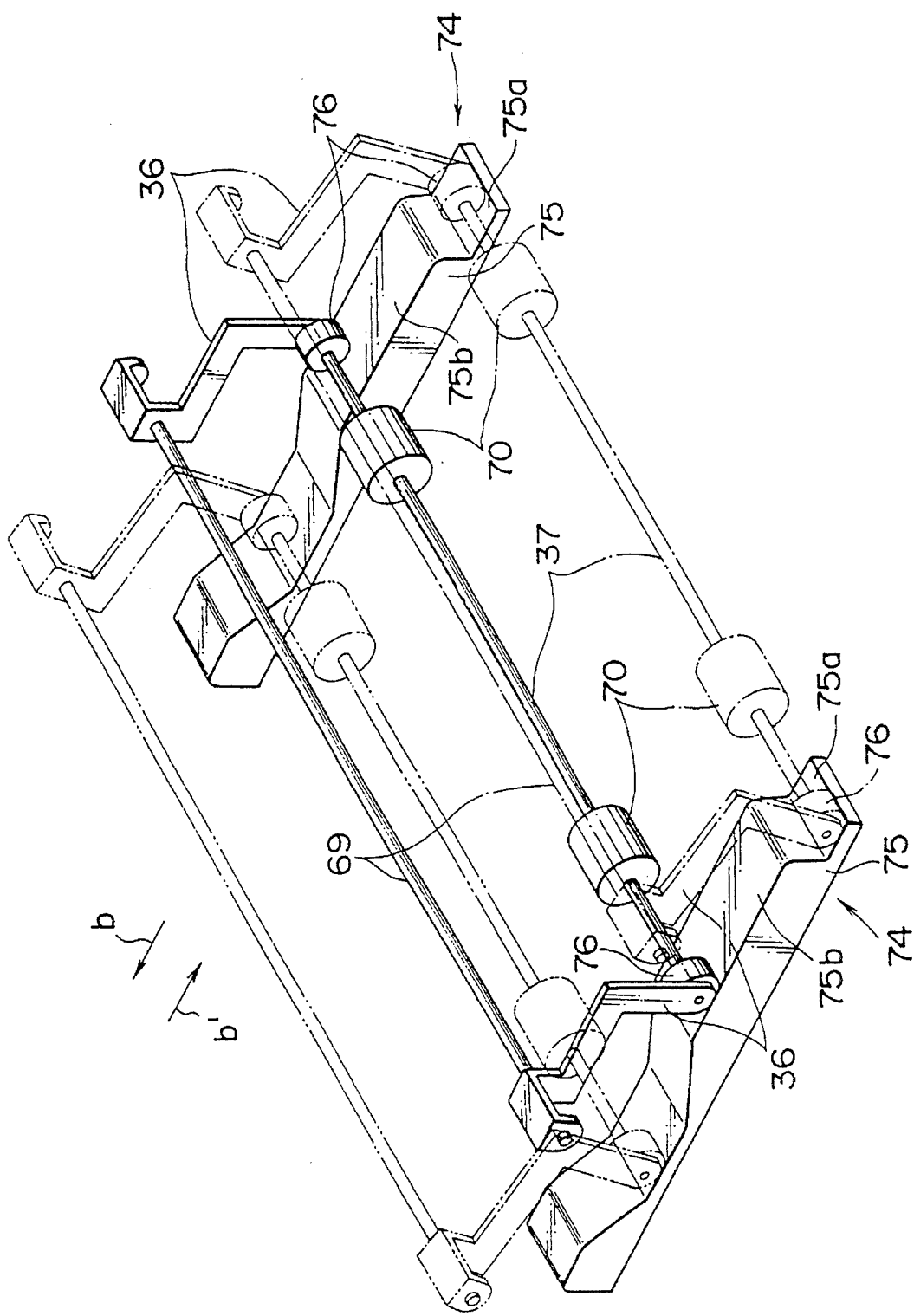
FIG. 11 is a perspective view showing an inject arm in the adapter.
Figure 13:
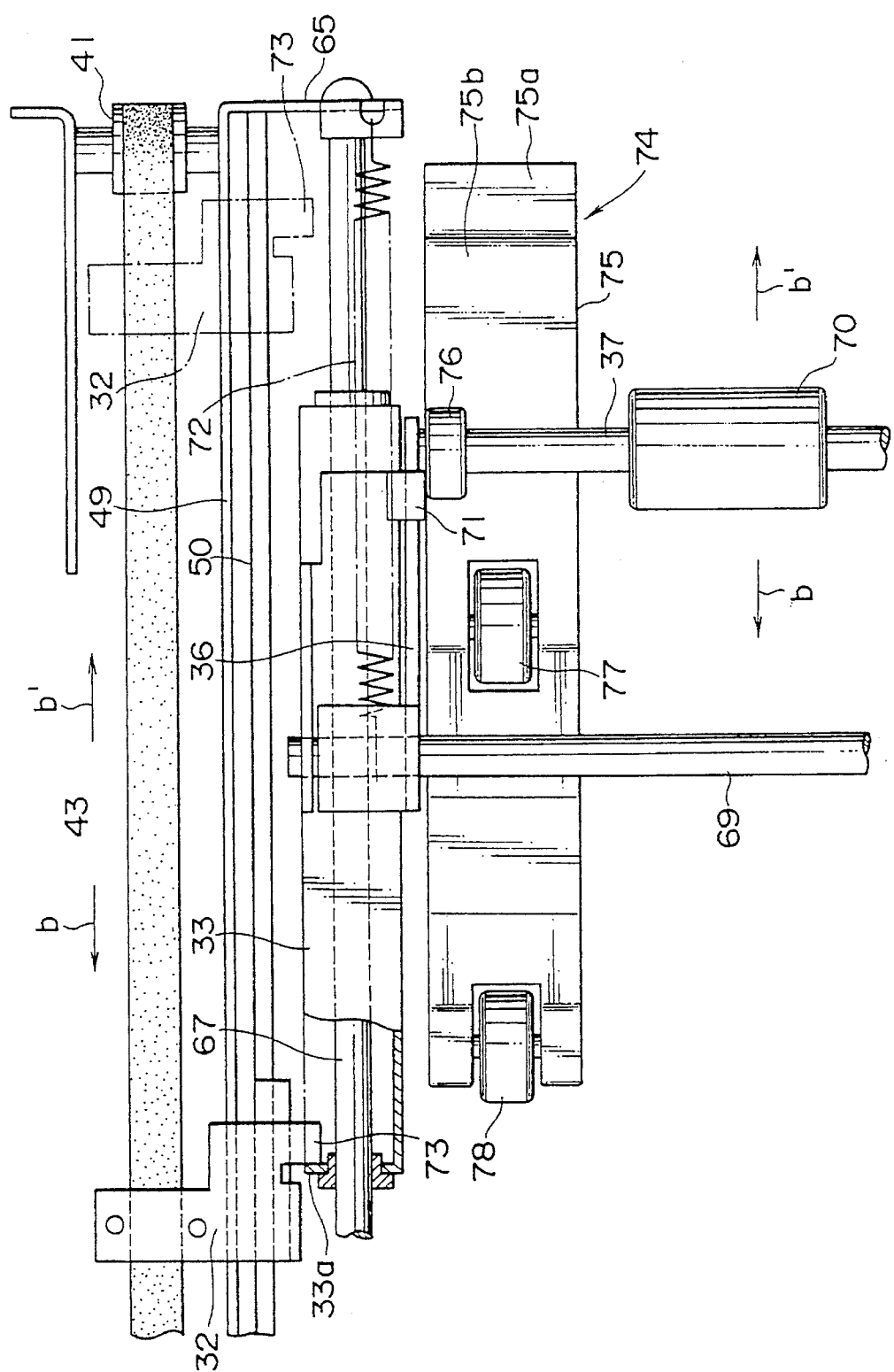
FIG. 13 is a plan view, with parts cutaway for clarity, of FIG. 12.

As shown in FIGS. 11–13, each of the second sliders 33 is slidably mounted on a corresponding one of the left an right upper guide shafts 67 and horizontally movable in the directions of the arrows b, b'. A connecting shaft 69 extends between respective upper portions of the second sliders 33, 33 in perpendicular relation to the direction of movement of the second sliders 33 indicated by the arrows b, b'. An upper end of each of the left and right inject arms 36 is rotatably mounted on an end of the connecting shaft 69 and pivotally movable in the directions indicated by the arrows g, g'. The left and right inject arms 36 have a substantially L shape and are arranged in bilateral symmetry. Downwardly extending free ends of the respective inject arms 36 are interconnected by the horizontal inject bar 37 extending horizontally in a direction perpendicular to the directions of the arrows b, b'. A pair of cassette presser rollers 70 is rotatably mounted on the inject bar 37 adjacent to the opposite ends of the inject bar 37.

The inject arms 36 and the inject bar 37 tend to turn about the connecting shaft 69 in the downward direction indicated by the arrow g' by the action of gravity or their own weights. To prevent the inject bar 37 from rotating in the direction of the arrow g beyond a predetermined limit, a pair of stoppers 71 is attached to upper ends of the second sliders 33, respectively.

A tension coil spring 72 acts between the connecting shaft 69 and the guide shaft attachment plate 65 on each of the guide rail attachment plates 49 to urge the corresponding second slider 33 in the direction of the arrow b' until the second slider 33 abuts on the guide shaft attachment plate 65.

The left and right first sliders 32 start moving from the phantom-lined fully retracted position indicated by the dot-and-dash lines in FIG. 13 in an advancing direction indicated by the arrow b. After the lapse of a predetermined period of time, horizontal drive projections 73 formed on the respective upper ends of the first sliders 32 are brought into abutment with one end 33a of the second sliders 33 which is located in the direction of the arrow b. A further advancing movement of the first sliders 32 causes the second sliders 33 to simultaneously advance in the direction of the arrow b against the force of the tension coil springs 72.

In the return trip, the second sliders 33 follow the horizontal movement of the first sliders 32 in the direction of the arrow b' under the force of the tension coil springs 72. However, the backward movement of the second sliders 33 in the direction of the arrow b' 33 is stopped when the second sliders 33 are brought to the fully retracted position upon abutment with the corresponding the guide shaft attachment plates 65. After the lapse of a predetermined period of time, the first sliders 32 arrive at their fully retracted positions indicated by the dot-and-dash lines shown in FIG. 13. The inject arms 36 and the inject bar 37 are simultaneously and horizontally reciprocated in the directions indicated by the arrows b, b' by the second sliders 33.

Each of the inject bars 37 is displaced by a action of a second cam mechanism 74 from a retracted position which is located below the cassette feed passage 30, to an inject position located within the cassette feed passage 30. The second cam mechanism 74 includes a cassette slide guide 75 extending parallel to the directions of the arrows b, ' and fixedly mounted on the adapter stage 19 at a position near a corresponding one of the left and right ends of the cassette feed passage 30, and a cam follower roller 76 rotatably mounted on the inject bar 37 near an end thereof.

The cassette slide guide 75 has a recessed portion 75a formed at an end thereof facing in the direction of the arrow b' for receiving therein the corresponding cam follower roller 76. The cam follower roller 76 when received in the recessed portion 75a retracts downwardly from the cassette feed passage 30. The cassette slide guide 75 also has an elongated flat higher portion or land 75b extending contiguously from the recessed portion 75a in the direction of the arrow b for displacing the corresponding cam follower roller 76 upwardly into the cassette feed passage 30.

When the left and right inject arms 36 are fully retracted in the direction of the arrow b', the cam follower rollers 76 fall into the recessed portions 75a of the corresponding cassette slide guides 75, thereby turning the inject arms 36 in the direction of the arrow g' to displace the inject bar 37 to a position below the cassette feed passage 30.

At a moment when the inject arms 36 concurrently start moving horizontally in the direction of the arrow b, the cam follower rollers 76 ride on the flat lands 75b of the corresponding cassette slide guides 75 whereupon the inject arms 36 turn in the direction of the arrow g to move the inject bar 37 upwardly into the cassette feed passage 30. With this upward movement of the inject bar 37, the cassette presser rollers 70 force a rear end face 5b of the cassette 5 in the direction of the arrow b.

A pair of cassette guide rollers 77, 78 are rotatably mounted on each of the cassette slide guides 75 in longitudinally spaced relation. The cassette guide roller 78 which is located at an end of the cassette slide guide 75 facing in the direction of the arrow b is slightly larger than the cassette guide roller 77, so that the cassette feed passage 30 has a bottom level 30a extending over the cassette slide guides 75 and slightly sloping upwardly in the direction of the arrow b, as shown in FIG. 7.

Figure 15:
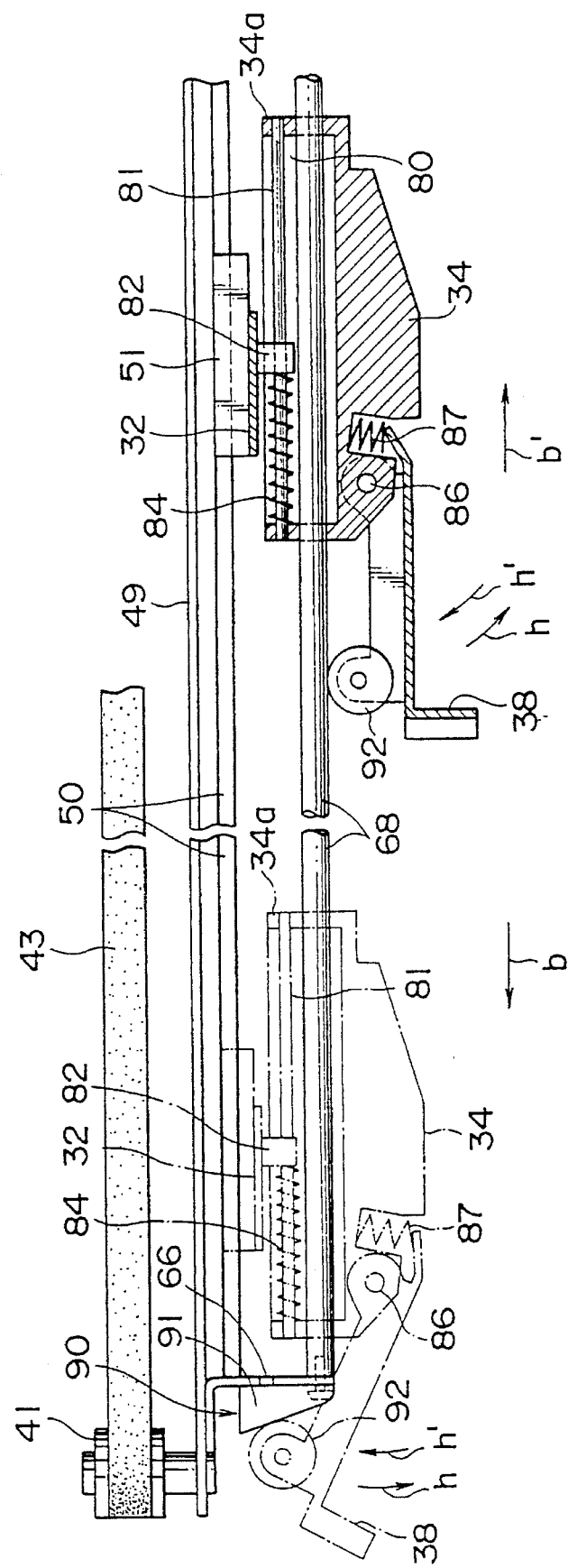
FIG. 15 is a plan view, with parts cutaway for clarity, of FIG. 14.
Figure 16:
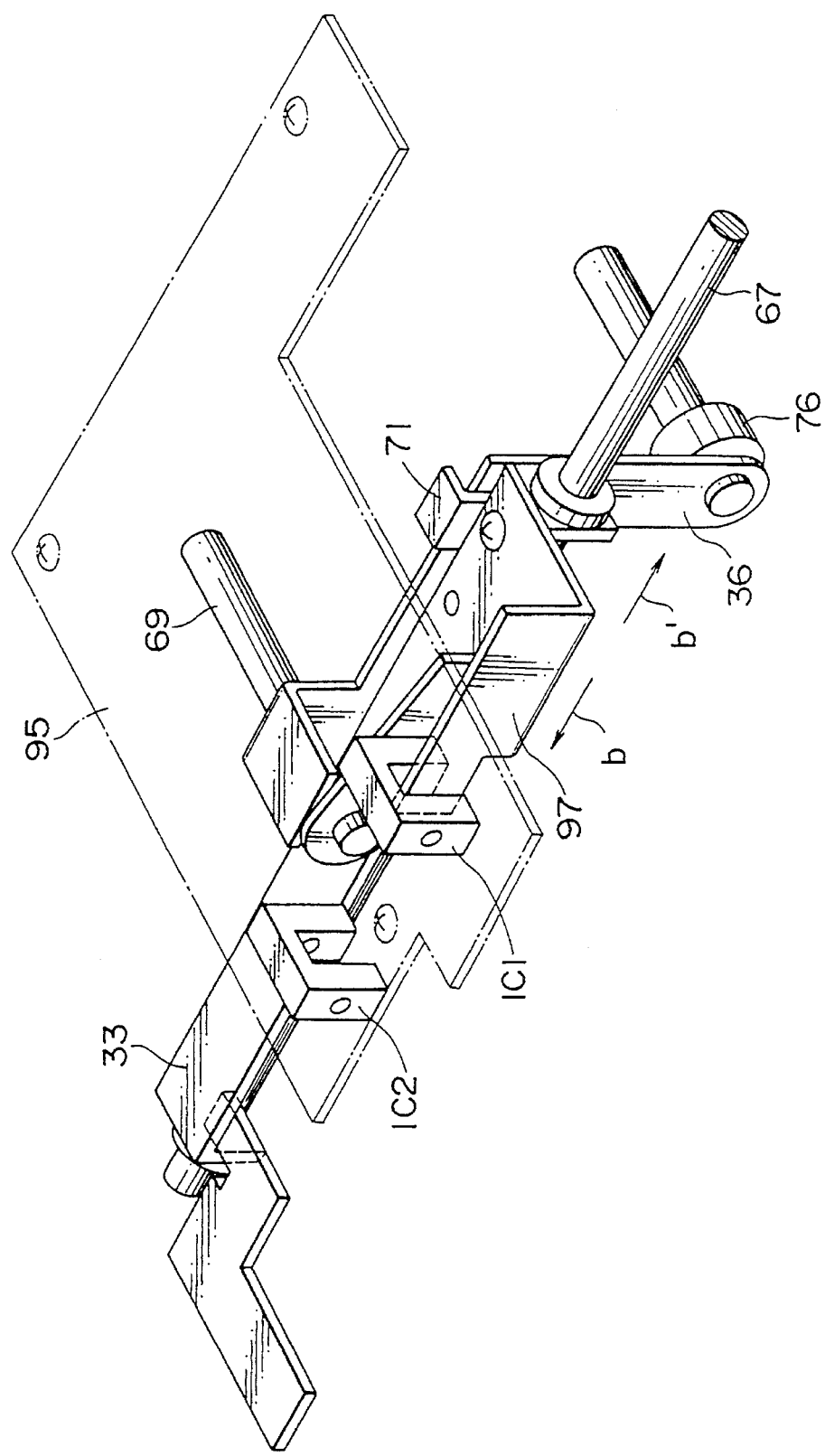
FIG. 16 is a perspective view showing an eject standby sensor and an inject finish sensor in the adapter.
Figure 17:
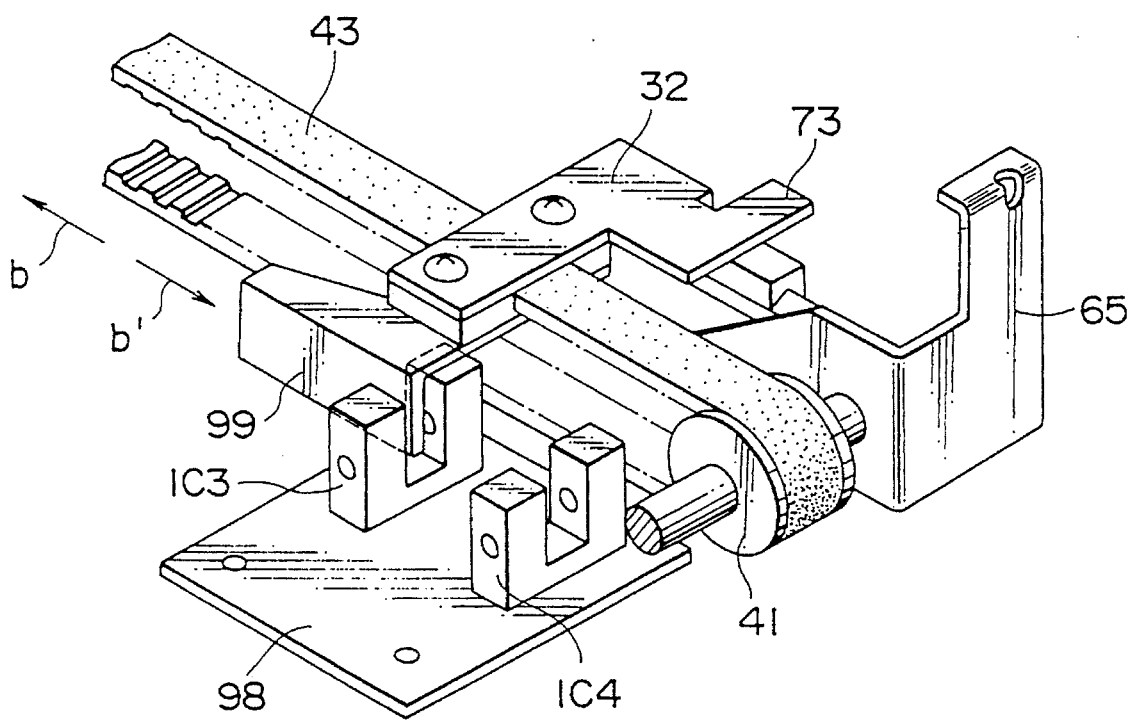
FIG. 17 is a perspective view showing an inject standby sensor and an eject finish sensor in the adapter.

As shown in FIGS. 14 and 15, each of the third sliders 34 is slidably mounted on a corresponding one of the lower guide shafts 68 and reciprocally movable in the directions of the arrows b, b'. The third slider 34 has a guide groove 80 extending longitudinally in an outer side surface thereof, and a horizontal guide pin 81 extending longitudinally across the guide groove 80 in a direction parallel to the directions of the arrows b, b'.

Each of the first slider 32 has on its inner side surface a horizontal actuating pin 82 loosely fitted in the guide groove 80 in a corresponding one of the third sliders 34. The actuating pin 82 has a horizontal slot 83 (FIG. 9) formed in its front end and loosely fitted over the guide pin 81 of the corresponding third slider 34. A cushioning compression coil spring 84 is loosely fitted around the guide pin 81 and acts between the guide pin 82 and the third slider 34 for cushioning or damping force when the guide pin 81 moves in the direction of the arrow b. Another cushioning compression coil spring 85 is loosely fitted around the lower guide shaft 68 and acts between the third slider 34 and the guide shaft attachment plate 65 for cushioning or damping force when the third slider 34 moves in the direction of the arrow b'.

The bilaterally symmetrical, left and right eject arms 38 have a substantially L shape. Each of the eject arms 38 is rotatably connected by a pivot shaft 36 to an inner side of the corresponding third slider 34 adjacent to an end facing toward the direction of the arrow b. The eject arm 38 is pivotally movable in the directions indicated by the arrows h, h'. The eject arm 38 is normally urged in the direction of the arrow h' by means of a compression coil spring 87.

The eject arms 38 are displaced by a pair of third cam mechanisms 90, respectively, from an inoperating position in which the eject arms 38 are retracted laterally outwardly from the cassette feed passage 30, and an operating position in which the eject arms 38 are projected into the cassette feed passage 30. Each of the third cam mechanisms 90 includes a cam plate 91 attached to the outside surface of a corresponding one of the guide shaft attachment plates 66 at a position lying in the same level as the lower guide shaft 68, a cam follower roller 92 rotatably mounted on the outer side of a corresponding one of the eject arms 38 adjacent to an end opposite the pivot shaft 86, and the compression coil spring 87 acting between the third slider 34 and the eject arm 38 to turn the latter in the direction of the arrow h' to displace the cam follower roller 92 laterally outwardly from the lower guide shaft 68.

With this arrangement, when the left and right first sliders 32 are moved horizontally in the direction of the arrow b, the actuating pins 82 on the respective first sliders 32 force the left and right third sliders 34 via the compression coil springs 84 to slide along the lower guide shafts 68 in the direction of the arrow b. In this instance, the left and right eject arms 38 move horizontally in the direction of the arrow b in unison with the corresponding third sliders 34.

During that time, since each of the cam follower rollers 92 rolls on and along the inner side of a corresponding one of the lower guide shafts 68 in the direction of the arrow b, as illustrated by the solid lines in FIG. 15, the eject arm 38 while moving in the direction of the arrow b is held in its operating position projecting laterally inwardly into the cassette feed passage 30.

As the first sliders 32 further advance in the direction of the arrow b, the third sliders 34 arrive at the fully advanced position indicated by the dot-and-dash lines in FIG. 15. At this moment, the cam follower rollers 92 on the third slider 34 move from the lower guide shafts 68 onto the corresponding cam plates 91 across the guide shaft attachment plates 66, whereupon the eject arms 38 are turned about the pivot shafts 86 in the direction of the arrow h' by the force of the compression coil springs 87. Thus, the eject arms 38 are retracted laterally outwardly from the cassette feed passage 30.

In a return trip, the first sliders 32 are moved in the direction of the arrow b' away from their fully retracted position indicated by the dot-and-dash lines in FIG. 15. When a predetermined period of time elapses after the start of backward movement of the first sliders 32, the actuating pins 82 on the respective first sliders 32 are brought into abutment with an end walls 34a of the third sliders 34. Thereafter, a backward movement of the first sliders 32 causes the third sliders 34 to move in the direction of the arrows b' toward their fully retracted position.

Shortly after the start of the backward movement of the third sliders 34 in the direction of the arrow b', the cam follower rollers 92 on the respective third sliders 34 are displaced from the cam plates 91 onto the lower guide shafts 68a, whereupon the eject arms 38 are turned in the direction of the arrow h against the force of the compression coil springs 87 and thus moved laterally inwardly into the cassette feed passage, as indicated in the solid lines in FIG. 15. Thereafter, the eject arms 38 are returned in the direction of the arrow b' toward their initial position during that time they are continuously present in the cassette feed passage 30.

As shown in FIGS. 5–7, a pair of upper and lower switch boards 95, 96 is disposed horizontally at one side of the cassette feed passage 30 in the adapter body 18. The upper and lower switch boards 95, 96 have inner confronting surfaces on which three photosensors $S_1$, $S_2$ and $S_3$ are disposed. Each of the photosensors $S_1$–$S_3$ is composed of a light source and a photoconductive element disposed in confrontation with each other across the cassette feed passage 30. The photosensors $S_1$, $S_2$ and $S_3$ are spaced at appropriate intervals in the direction of the arrow b'.

As shown in FIGS. 5–7 and 16, an eject standby sensor $IC_1$ composed of a photocoupler and an inject finish sensor $IC_2$ composed of a photocoupler are disposed on the underside of the upper switch board 95 adjacent to an end of the switch board 95 facing in the direction of the arrow b. These sensors $IC_1$, $IC_2$ are aligned in a direction parallel to the directions of the arrows b, b' and have an inverted U shape. A common shutter plate 97 is attached to one of the second slider 33 (left slider 33 in the illustrated embodiment) for activating the sensors $IC_1$, $IC_2$.

Similarly, as shown in FIGS. 5–7 and 17, a switch board 98 is mounted within the adapter body 18 and located at one side of the adapter body 18 adjacent to one end thereof in the direction of the arrow b'. A substantially U-shaped inject standby sensor $IC_3$ composed of a photocoupler and a substantially U-shaped eject finish sensor $IC_4$ composed of a photocoupler are mounted on an upper surface of the switch board 98 and aligned with each other in a direction parallel to the directions of the arrows b, b'. A common shutter plate 99 is attached to one of the sliders 32 (left slider 32 in the illustrated embodiment) for activating the sensors $IC_3$, $IC_4$.

Cassette Compartment

The cassette compartment 15 in the DIR 6 will be described below with reference to FIGS. 18 and 19.

Figure 18:
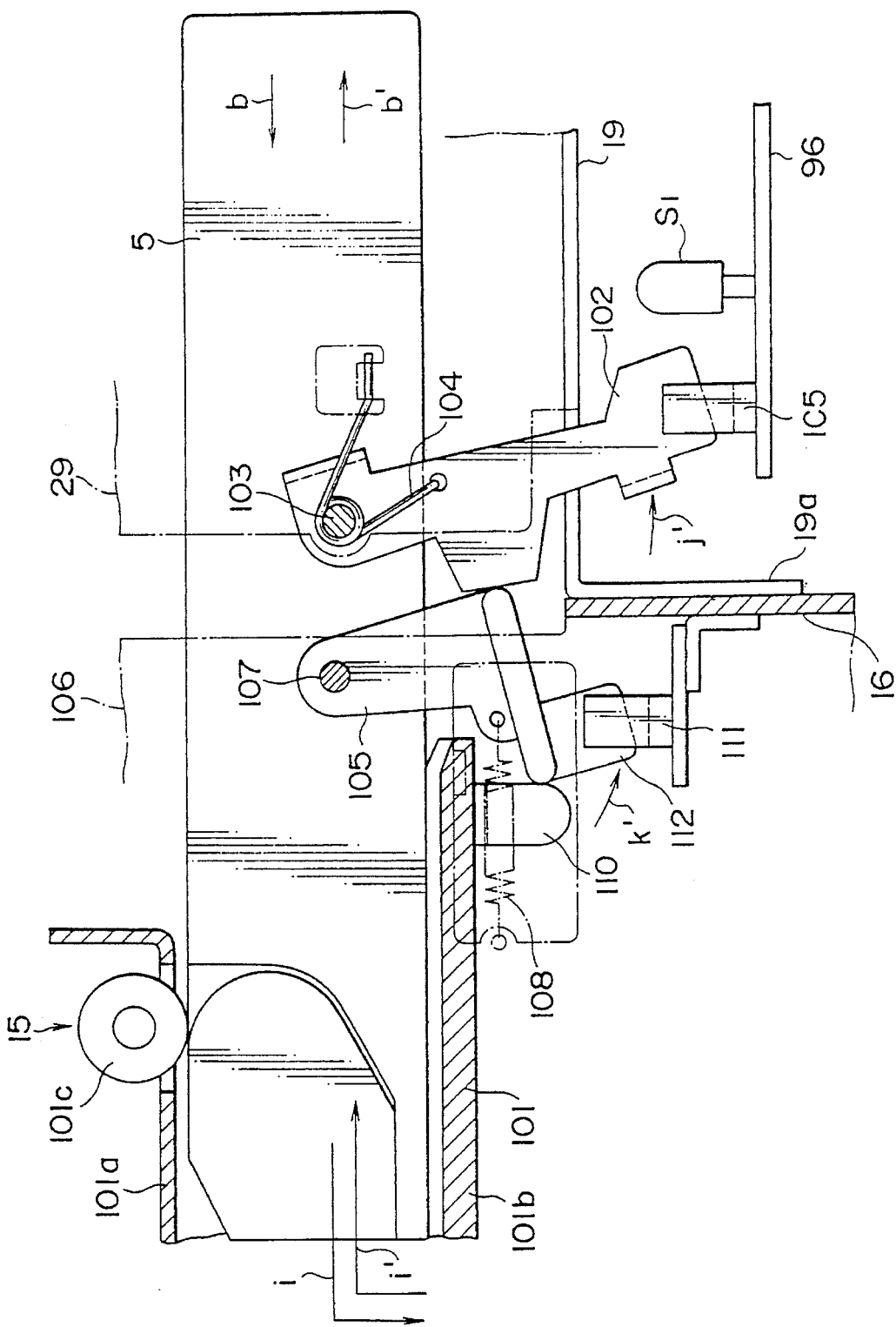
FIG. 18 is a side view, with parts cutaway for clarity, showing the closed state of an up-down sensor for detecting up and down of a cassette compartment in the adapter.
Figure 19:
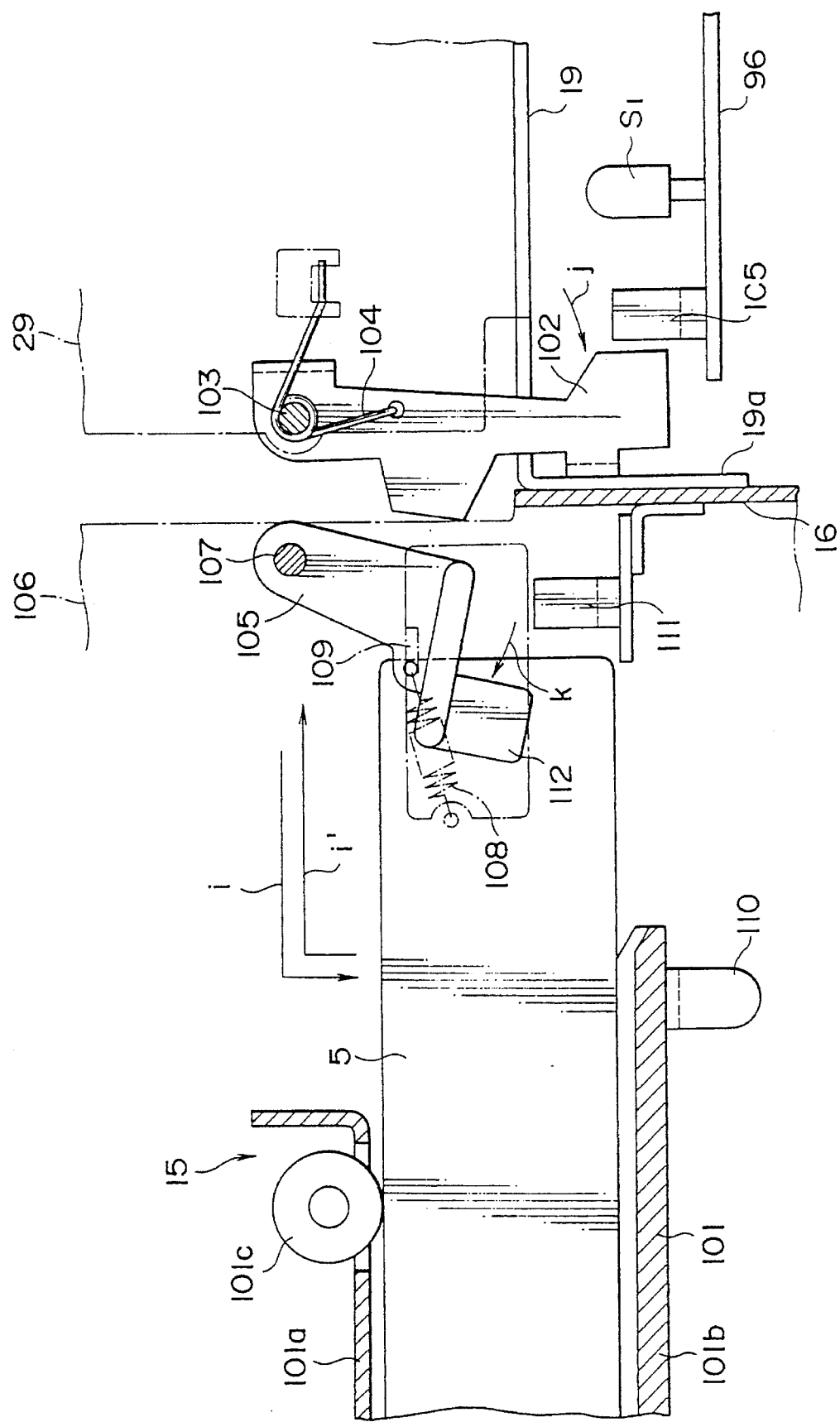
FIG. 19 is a side view, with parts cutaway for clarity, of the up-down sensor as it is in the open state.

The cassette compartment 15 in the DIR 6 includes a cassette holder 101 for moving the cassette 5 between a cassette inserting position ("up" position) shown in FIG. 18 and a cassette loading position ("down" position) shown in FIG. 19, so as to pull or draw the cassette 5 for loading the same along a substantially L-shaped feed path in the direction of the arrow i, or to force out the cassette 5 for ejecting the same along the L-shaped feed path in the direction of the arrow i'. The cassette holder 101 has a top plate 101a on which is rotatably mounted a cassette presser roller 101c for forcing the cassette 5 against the bottom plate 101b of the cassette holder 101 to hold the cassette 5 within the cassette holder 101.

In order to discriminating the "up" position and the "down" position of the cassette holder 101, an up-down sensor $IC_5$ is disposed within the adapter body 18.

The up-down sensor $IC_5$ is composed of a photocoupler arrange in a substantially U shape and mounted on an upper surface of the lower switch board 96 near one side thereof, the up-down sensor $IC_5$ being located at an end of the switch board 96 facing in the direction of the arrow b. In order to activate the up-down sensor $IC_5$, a shutter plate 102 is rotatably connected at its upper end to one of the side plates 29 by means of a horizontal pivot shaft 103. The shutter plate 102 is pivotally movable in the directions of the arrows j, j'. The shutter plate 102 is normally urged against the back plate 10a of the adapter stage 19 by the force of a torsion spring 104 tending to turn the shutter plate 102 in the direction of the arrow j.

The shutter 102 is pivotally actuated by an actuating arm 102. The actuating arm 102 has an upper end rotatably connected by a horizontal pivot shaft 107 to a side plate 106 formed integrally with the cassette compartment attachment plate 16. Thus, the actuating arm 102 is pivotally movable abut the pivot shaft 107 in the directions of the arrows k, k'. The actuating arm 102 is normally urged against a stopper 109 on the side plate 106 by the force of a tension coil spring 108 tending to turn the actuating arm 102 in the direction of the arrow k.

The actuating arm 105 is turned in the direction of the arrow k' by means of an actuating projection 110 provided on the underside of the cassette holder 101.

The cassette compartment 15 has disposed therein an "up" sensor 111 composed of a photosensor for discriminating the "up" position of the cassette holder 101. The "up" sensor 111 is activated by a shutter plate 112 formed integrally with a lower end of the actuating arm 105.

As shown in FIG. 18, when the cassette holder 101 is displaced in the direction of the arrow i' from the "down" position to the "up" position, the actuating projection 110 is brought into contact with the actuating arm 105 and then forces the latter to turn in the direction of the arrow k' against the force of the compression coil spring 108.

The actuating arm 105 is in turn brought into abutment with the shutter plate 102 and then turns the shutter plate 102 in the direction of the arrow j' against the force of the torsion spring 104.

The thus turned shutter plate 102 blocks the path of light in the up-down sensor $IC_5$ to close or activate the up-down sensor $IC_5$, so that a control system associated with the adaptor 17 can discriminate the "up" condition of the cassette holder 101 in the cassette compartment 15.

Conversely, when the cassette holder 101 is displaced in the direction of the arrow i from the "up" position to the "down" position shown in FIG. 19, the actuating projection 110 disengages from the actuating arm 105 and moves in the direction of the arrow i.

With this movement of the actuating projection 110, the actuating arm 105 and the shutter plate 102 are turned in the directions of the arrows k and j, respectively, by the forces of the tension coil spring 108 and the torsion spring 104. The up-down sensor $IC_5$ is now deactivated or opened by the shutter plate 102, whereby the cassette holder 101 disposed in the "down" position in the cassette compartment 15 can be discriminated by the control system of the adapter 17.

Cassette Transfer Mechanism In Elevator

A cassette transfer mechanism 15 disposed in the elevator 2 will be described below with reference to FIGS. 20 and 21.

The cassette transfer mechanism 15 includes a plurality of transfer belts 116 (six being shown) for taking in and out the cassette 5 from the left and right cassette entrances 2a to the corresponding cassette storage shelves 4 in the directions of the arrows a, a', a plurality of transfer belts 117 (two being shown) for taking in and out the cassette 5 from the front cassette entrance 2b to the adapter 7 in the directions of the arrows b, b', and a plurality of cassette presser rollers 118. The transfer belts 117 are parallel with each other and Simultaneously movable up and down in the directions indicated by the arrows m and m'.

The elevator 2 has a protruding cassette sensor $S_4$ disposed at the front cassette entrance 2b for detecting the cassette 5 when the cassette 5 juts or protrudes from the front cassette entrance 2b. The protruding cassette sensor $S_4$ is a photosensor composed of a light source and a photo-conductive element that are respectively disposed above and below the front cassette entrance 2b.

Power Failure Control Circuit Associated With Elevator

A power failure control circuit associated with the elevator 2 will be described with reference to FIG. 38.

The power failure control circuit 124 serves as a control means for controlling the operation of the elevator 2 when a power failure takes place. To this end, the power failure control circuit 124 includes a capacitor backup circuit 125 and a power failure detecting circuit 126 that are connected with a common external power supply. The output from the capacitor backup circuit 125 is supplied a backup power supply to an elevator holding motor 127 and a cassette transfer motor 128 for driving the cassette transfer mechanism 115. The power failure detecting circuit 126 outputs a power failure signal to an elevator controller 129. To the elevator controller 129 is also supplied a cassette transfer instruction signal delivered from a host controller 130. The elevator controller 129 outputs a control signal to the cassette transfer motor 128.

Operation Of Cassette Autochanger

The cassette autochanger of the foregoing construction operates as follows. For better illustration of the movement of the cassette 5, the position of the sensors $IC_3$ and $IC_4$ shown in FIGS. 20 and 22 through 32 is somewhat displaced from the actual position.

Cassette Supplying Operation From Elevator

At first, operation achieved to feed or supply the cassette 5 from the elevator 2 into the adapter 7 will be described below with reference to FIGS. 20–24 taken in conjunction with the power failure circuit 124 shown in FIG. 38 and the flowchart shown in FIG. 39.

Figure 20:
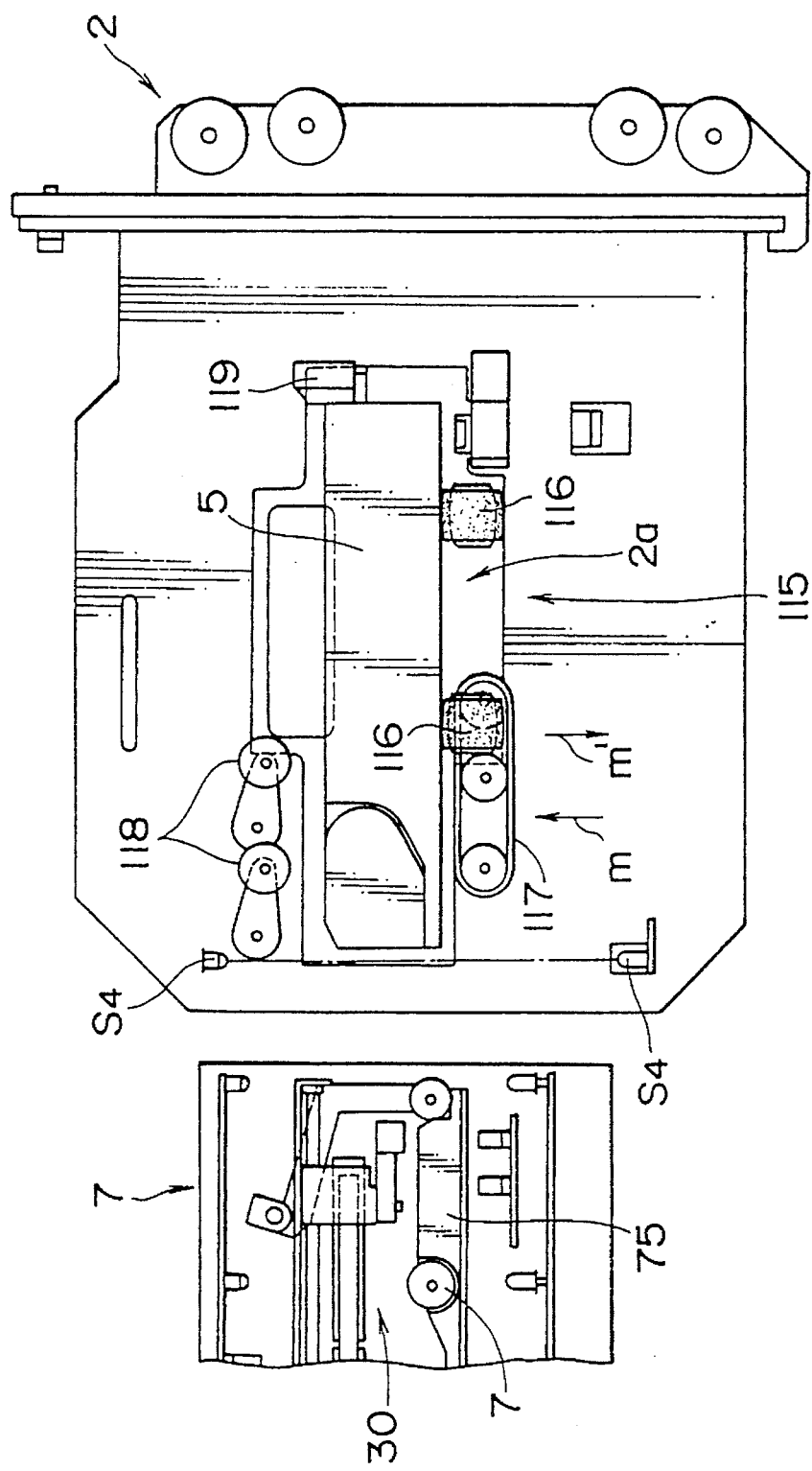
FIG. 20 is a side view, with parts cutaway for clarity, of a cassette transfer mechanism in an elevator of the cassette autochanger, showing the condition in which injection of a cassette to the adapter is started.
Figure 21:
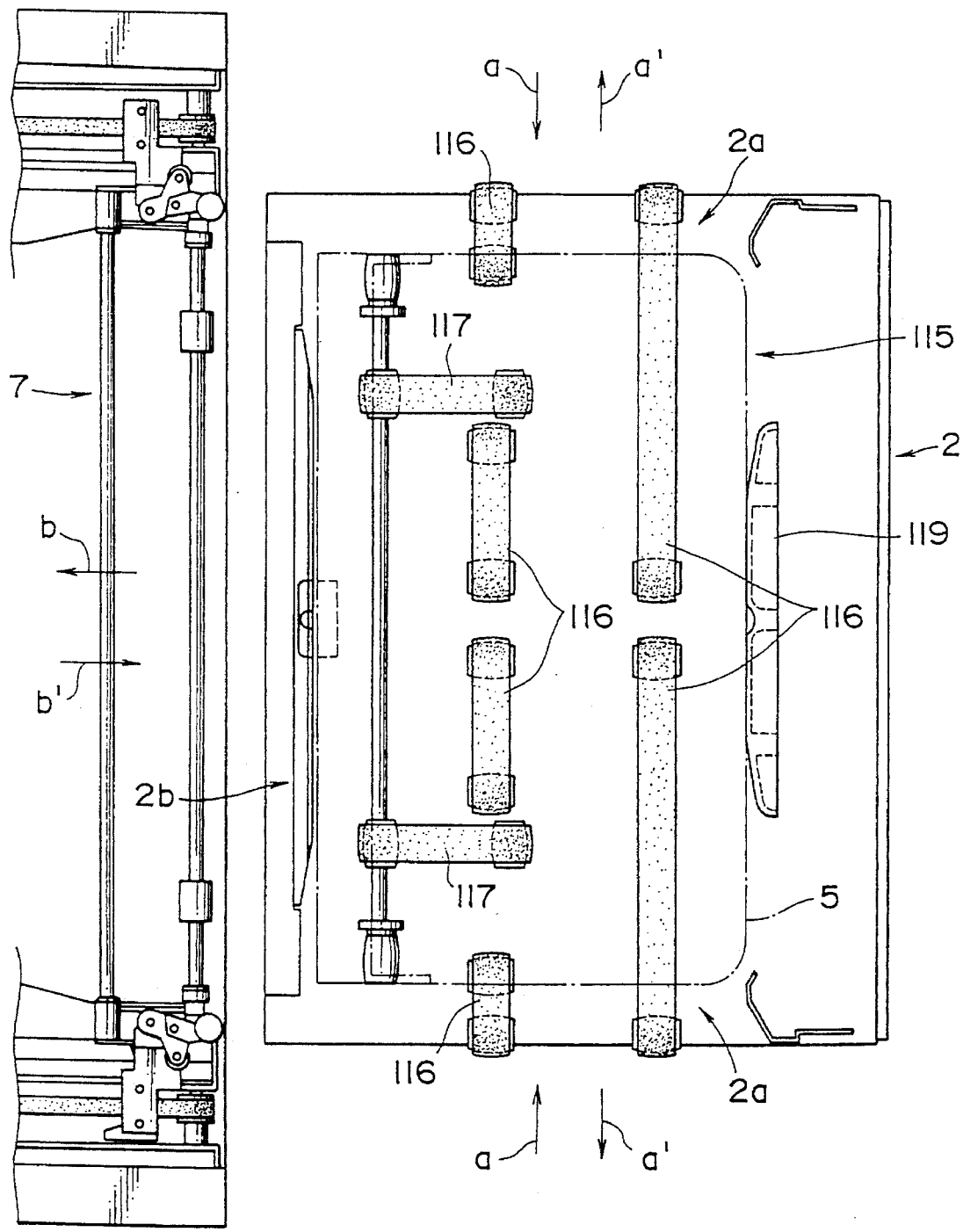
FIG. 21 is a plan view, with parts cutaway for clarity, of FIG. 20.

FIGS. 20 and 21 show the elevator 2 as it is in a cassette supplying standby condition in which the elevator 2 is positioned by the elevator holding motor 127 with its cassette entrance 2b disposed in confrontation with the adapter 7.

In this instance, the transfer belts 117 of the cassette transfer mechanism 115 are disposed in a "down" position, and the cassette 5 placed horizontally on the transfer belts 117 is disposed in its home position.

Figure 22:
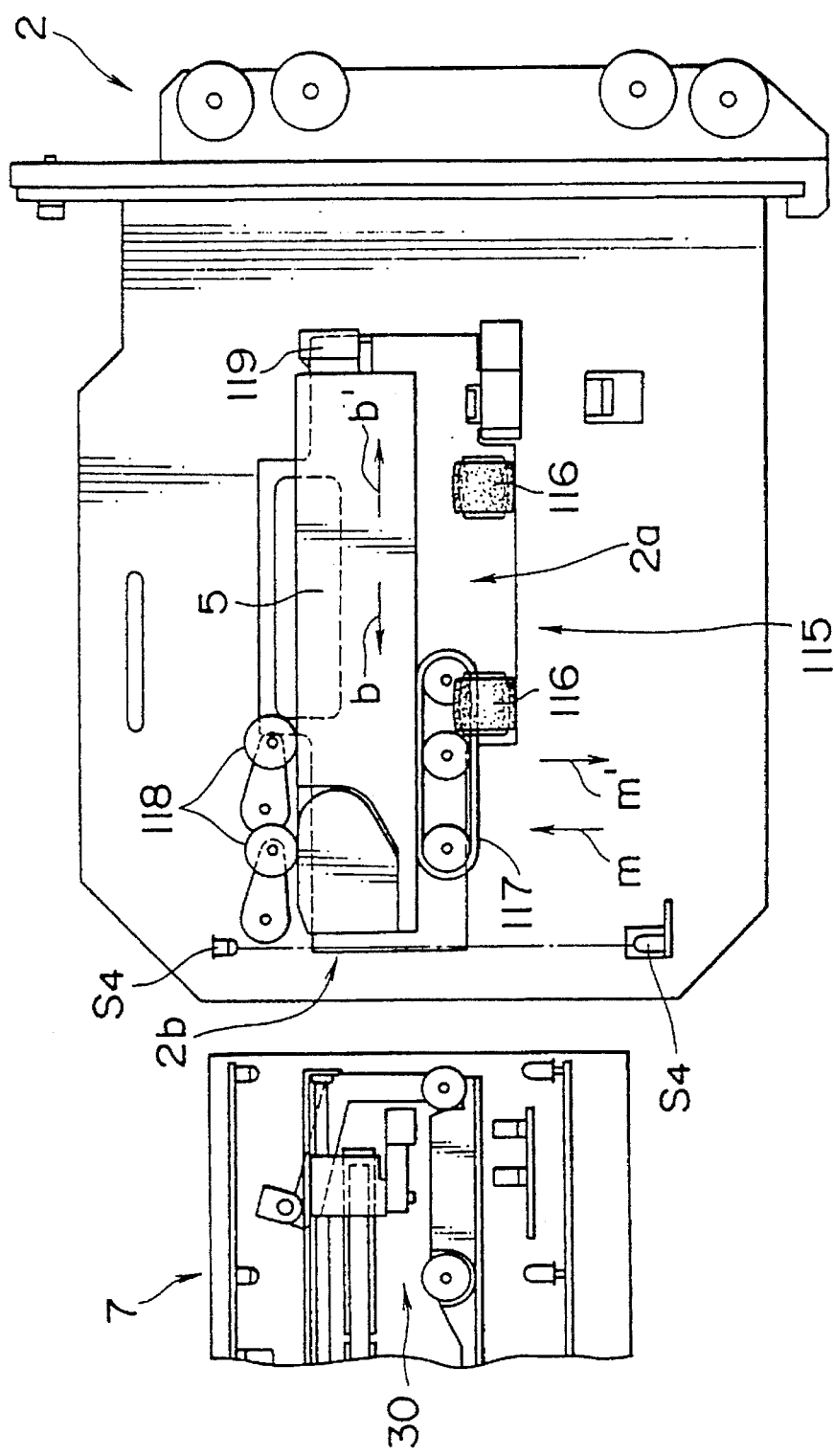
FIG. 22 is a side view, with parts cutaway for clarity, showing the cassette in the elevator as it is on the way of injection to the adapter.

When the host controller 130 sends a cassette transfer instruction to the elevator controller 129, the transfer belts 117 are moved in the direction of the arrow m from the "down" position to the "up" position shown in FIG. 22. With this upward movement of the transfer belts 117, the cassette 5 is forced downwardly against the transfer belts 117 by means of the cassette presser rollers 118.

Upon arrival at the "up" position, the transfer belts 117 are rotated in the counterclockwise direction in FIG. 22 to feed or supply the cassette 5 in the direction of the arrow b toward the adapter 7.

In this instance, if the condition is normal, the elevator controller 129 outputs a low-speed rotation instruction signal to the cassette transfer motor 128 whereby the transfer belts 117 are rotated in a low-speed transfer mode which is effected at a low speed of about 100 mm/sec. Thus, the cassette 5 on the transfer belts 117 is horizontally fed out at the low speed in the direction of the arrow $\underline{b}$.

On the other hand, if a power failure occurs before the transfer belts 117 start feeding the cassette 5 in the direction of the arrow $\underline{b}$ (or immediately before the protruding cassette sensor $S_4$ disposed at the cassette entrance 2b is closed by the cassette 5 being advanced in the direction of the arrow b by the transfer belts 117, as shown in FIG. 22), the occurrence of the power failure is detected by the power failure detecting circuit 126 which in turn outputs a power failure signal to the elevator controller 129. During the power failure, a backup power from the capacitor backup circuit 125 is supplied to the elevator holding motor 127 and the cassette transfer motor 128.

When the power failure signal is supplied to the elevator controller 129, the elevator controller 129 outputs a cassette transfer interrupting instruction signal to the cassette transfer motor 128 so as to lower the transfer belts 117 to the "down" position either immediately or after the cassette 5 is moved backward in the direction of the arrow b' by the rotation of the transfer belts 117 in the clockwise direction in FIG. 22 until the cassette 5 arrives at its home position.

If the power failure takes place after the protruding cassette sensor $S_4$ at the cassette entrance 2b is closed by the cassette 5 while being advanced in the direction of the arrow $\underline{b}$ by the transfer belts 17, as shown in FIG. 22, the elevator controller 129 outputs a high-speed rotation instruction signal to the cassette transfer motor 128 based on a power failure signal supplied to the elevator controller 129 from the power failure detecting circuit 126.

The operation mode of the transfer belts 117 is thus shifted from the low-speed transfer mode to the high-speed transfer mode in which the transfer belts 117 are driven at a high sped of about 200 mm/sec which is twice as fast as the speed in the low-speed transfer mode. Thus, the cassette 5 is fed at the high speed in the direction of the arrow $\underline{b}$.

Figure 23:
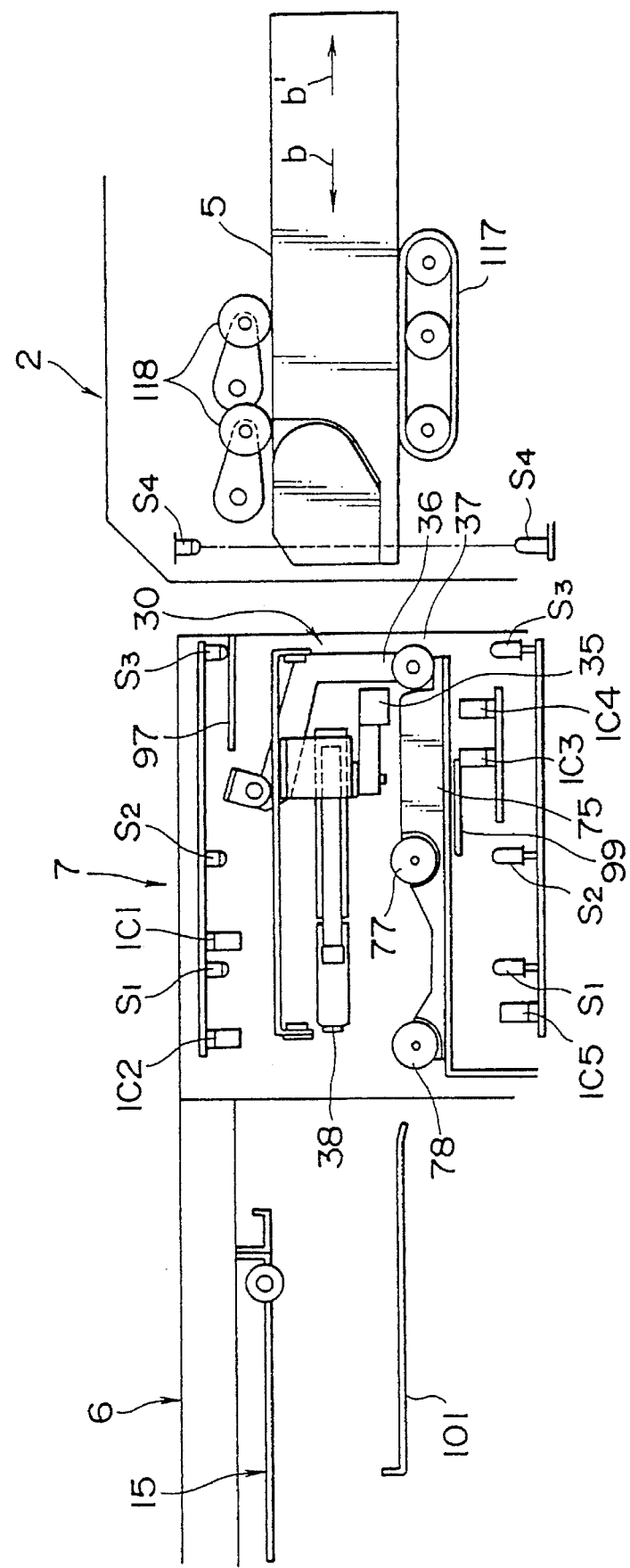
FIG. 23 is a side view, with parts cutaway for clarity, showing the condition in which the cassette starts being injected from the elevator in the cassette autochanger through the adapter into the cassette compartment.
Figure 24:
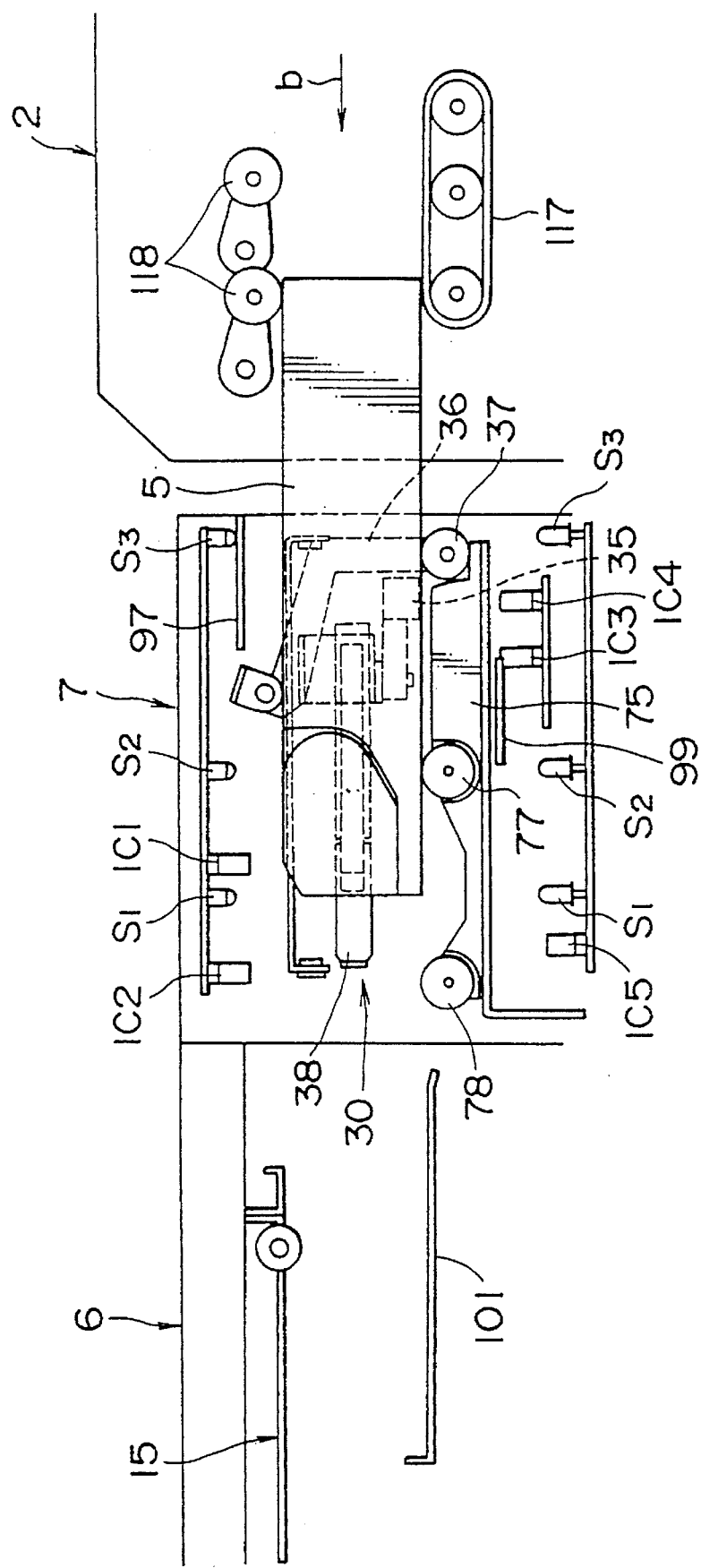
FIG. 24 is a side view, with parts cutaway for clarity, showing the condition in which the cassette injecting operation proceeds to from the condition shown in FIG. 23.

As understood from the foregoing description, when the power failure takes place, the cassette 5 is fed or supplied horizontally at the high speed into the adapter 7 as shown in FIGS. 23 and 24 while the power supplied to the elevator holding motor 127 and the cassette transfer motor 128 is backed up.

Figure 38:
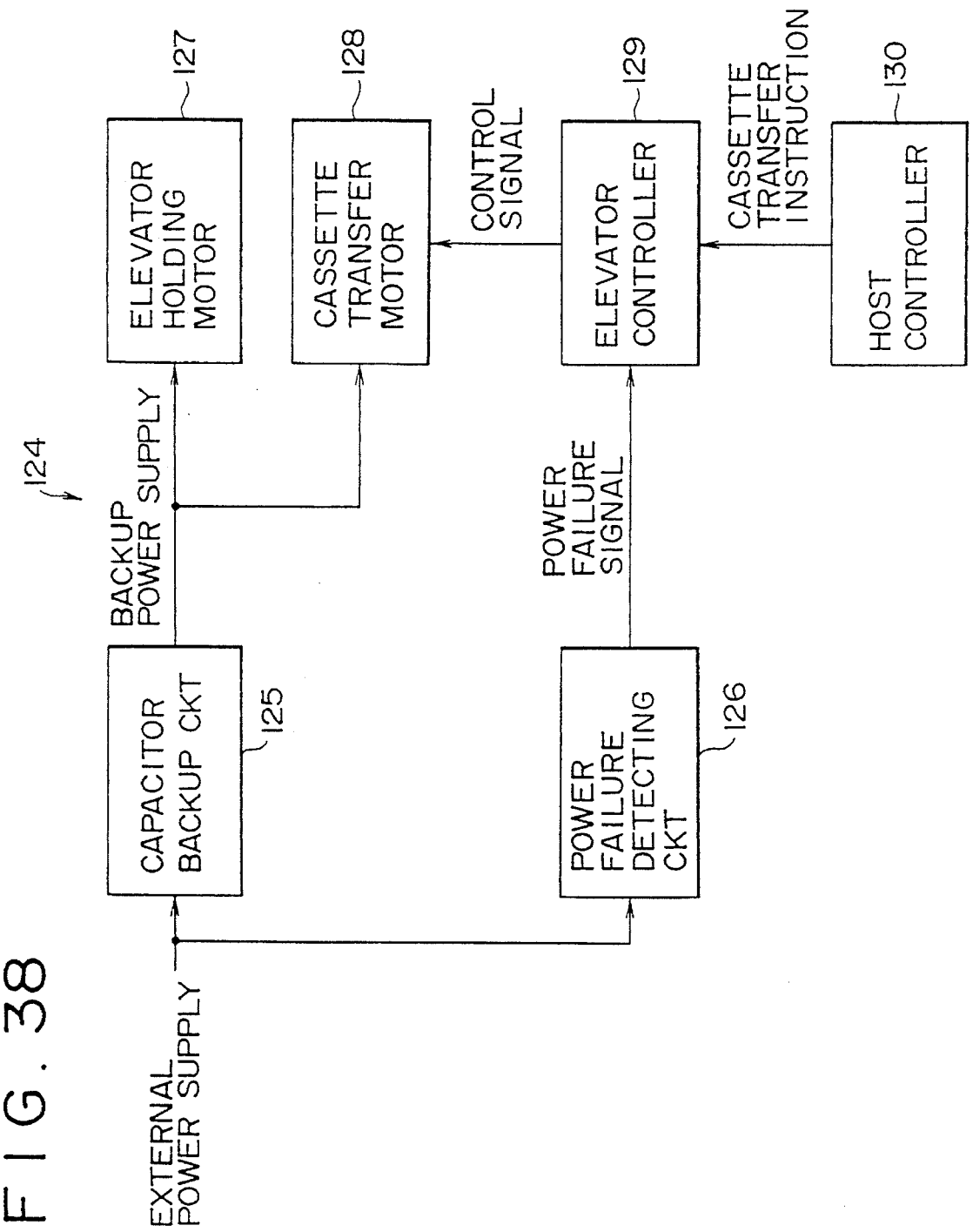
FIG. 38 is a block diagram showing a power failure control circuit for the cassette transfer mechanism of the elevator of the cassette autochanger.
Figure 39:
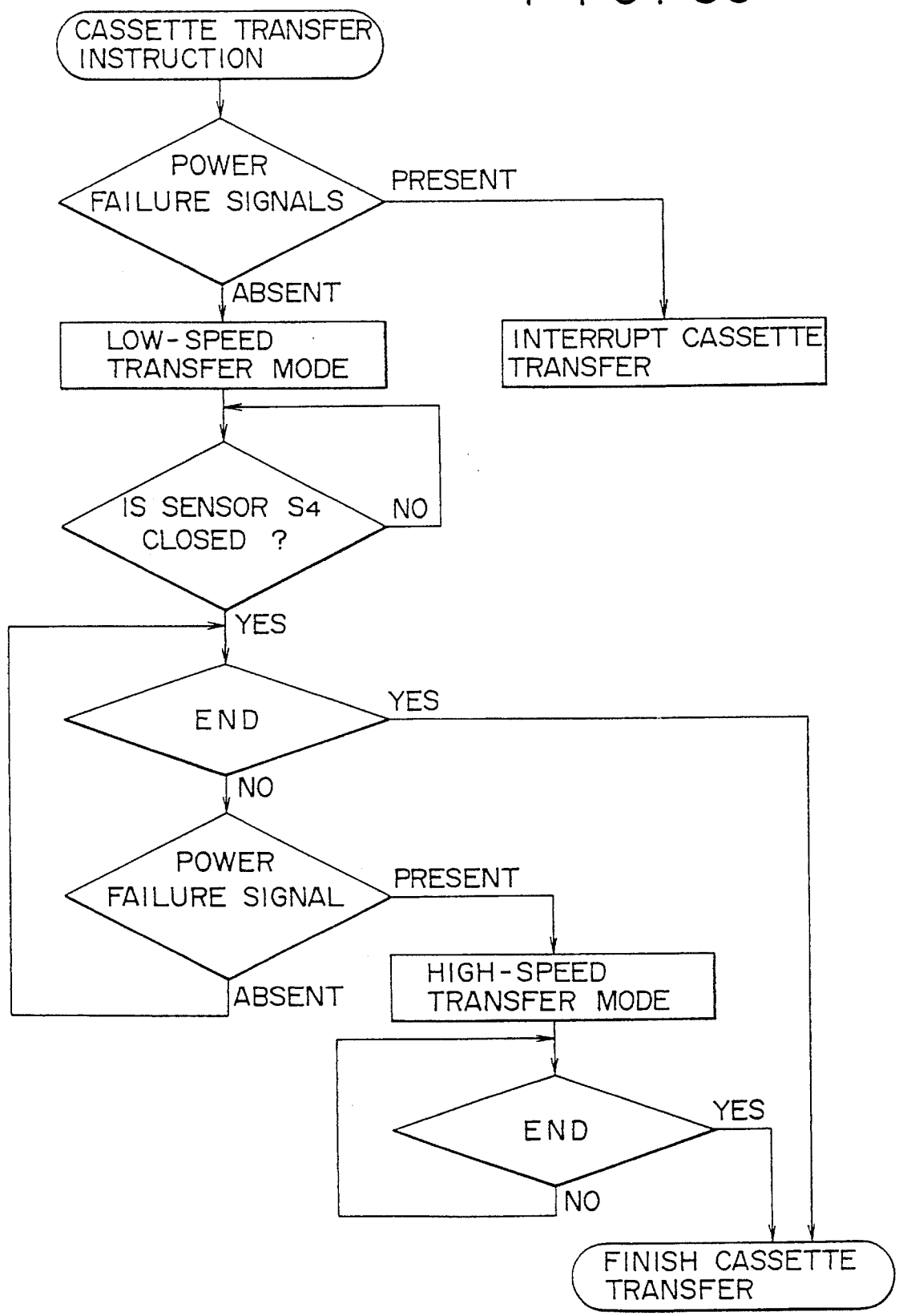
FIG. 39 is a flowchart showing the control operation at a power failure of the power failure control circuit shown in FIG. 38.

Owing to the power failure control circuit 124 shown in FIG. 38 and according to the flowchart shown in FIG. 39, in the normal condition, the cassette 5 is fed from the elevator 2 to the adapter 7 at a low speed in the low-speed transfer mode, and when a power failure takes place, the cassette 5 is fed from the elevator 2 to the adapter 7 at a high speed in the high-speed transfer mode. Since the cassette transfer in the normal condition is achieved at a low speed without the necessity of changing the power supply backup circuit, it is possible to lower loads on the cassette transfer mechanism 115 and the cassette 5 and eventually improve the reliability and durability of the cassette autochanger.

In the normal condition, the cassette 5 is fed or supplied at the low speed into the adapter 7, as described above. It is, therefore, possible to prevent generation of ground particles of rubber or plastic which would otherwise occur due to abrasion of the transfer belts 117 and the cassette 5. The load on the transfer belts 117 and load on the cassette 5 can be lowered with the result that the reliability and the durability of these components can be improved.

Inject Operation Of Adapter

Operation achieved to inject the cassette 5 from the adapter 7 into the cassette compartment 15 will be described with reference to FIGS. 23–28 and FIGS. 33–35.

Figure 33:
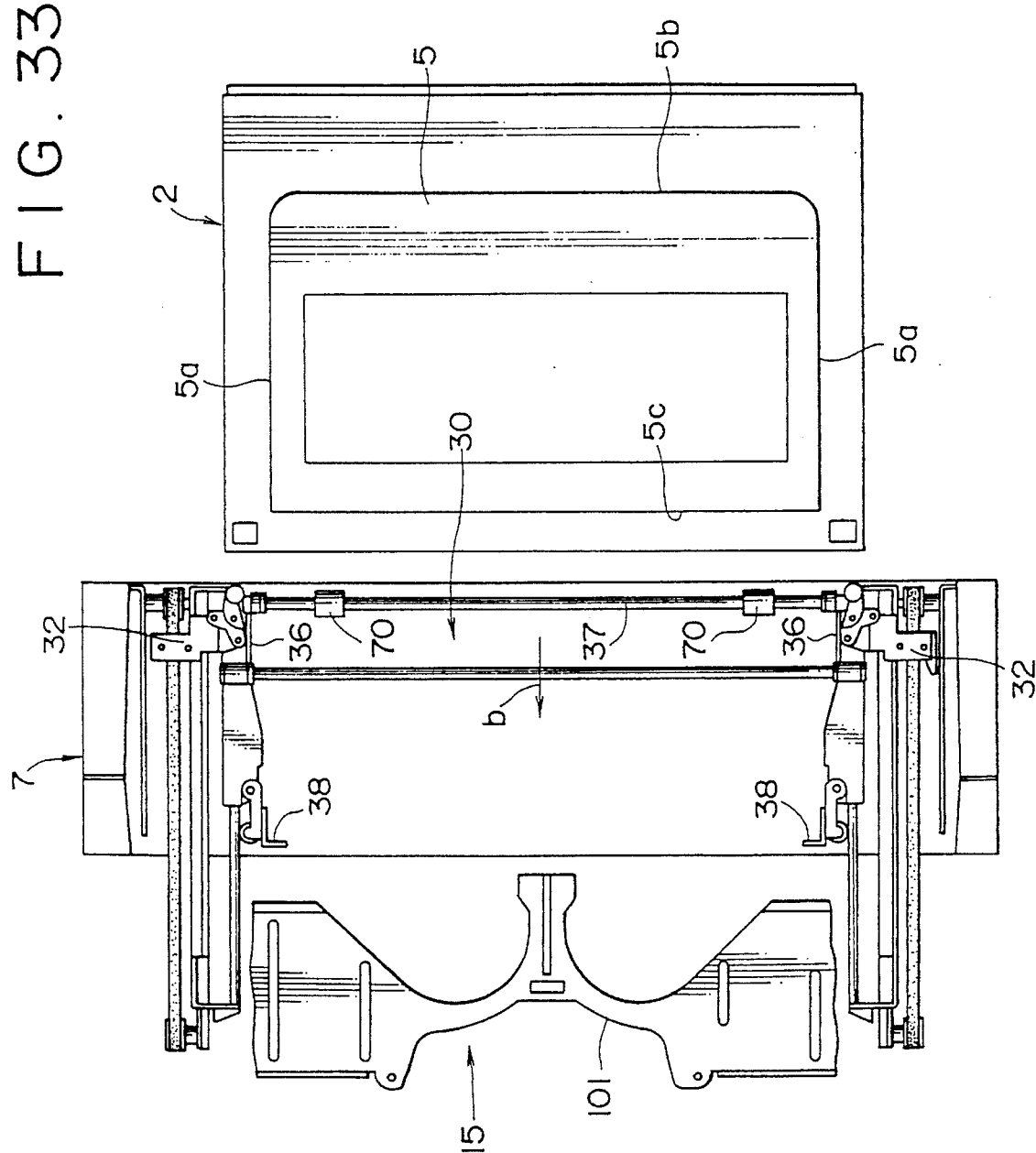
FIG. 33 is a plan view, with parts cutaway for clarity, of FIG. 23.

FIGS. 23 and 33 show the adapter 7 as it is in an inject standby condition in which the left and right side arms 35, left and right inject arms 36 and left and right eject arms 38 are all disposed in their fully retracted positions. Furthermore, the side arms 35 are retracted laterally outwardly from the cassette feed passage 30, and the inject bar 37 is retracted downwardly from the cassette feed passage 30.

In this inject standby condition, the inject standby sensor $IC_3$ is closed or activated by the shutter plate 99.

At the time of cassette injection, the cassette 5 fed by the transfer belts 117 of the elevator 2 passes over and across the inject bar 37 in the direction of the arrow b and placed horizontally over the left and right cassette slide guides 76 disposed in the cassette transfer passage 30.

As the cassettes 5 moves into the cassette transfer passage 30, the cassette sensors $S_3$ and $S_2$ are closed or activated in succession by the cassette 5.

The cassette sensor $S_3$, when closed, detects the insertion of the cassette 5 into the adapter 7. The cassette sensor $S_2$, which is activated shortly after the activation of the cassette sensor $S_3$, serves as a start trigger for the motor 46 shown in FIG. 8. The motor 46 is rotated in the forward direction to feed the left and right first sliders 32 simultaneously in the direction of the arrow b.

As the first sliders 32 advance in the direction of the arrow b, the side arms 38 moving in unison with the corresponding first sliders 32 are displaced laterally inwardly toward each other by the first cam mechanisms 61 shown in FIGS. 9 and 10. Thus, the cassette 5 is gripped on its left and right side surfaces 5b by the side arms 35. As the advancing movement of the first sliders 32 and the associated side arms 35 continues, the cassette 5 is drawn in the direction of the arrow b from the elevator 2 into the cassette feed passage 30 in the adapter 7. In this instance, the cassette 5 is held in alignment with a longitudinal center line of the cassette feed passage 30 by means of the left and right side arms 35.

The front end face 5c side of the cassette 5 which is drawn from the elevator 2 into the adapter 7 by means of the side arms 35 is continuously inserted into the cassette holder 101 in the cassette compartment 15 of the DIR 6.

In this instance, the cassette 5 is advanced in the direction of the arrow b while it is being guided on the left and right guide roller pairs 77, 78. During that time, only a small friction acts between the guide rollers 77, 78 and the cassette 5. Since due to the difference in diameter between the guide rollers 77 and the guide rollers 78, the bottom level 30a of the cassette feed passage 30 slopes upwardly toward the direction of the arrow b, as shown in FIG. 7, the cassette 5 as it is inserted in the cassette holder 101 slightly tips up with its front end face 5c directed toward an obliquely upward direction.

By virtue of this upwardly tipping posture of the cassette 5, a central guide groove (not shown) formed in the underside of the cassette 5 can be smoothly fitted over a central guide rib (not shown) formed on an upper surface of the bottom plate 101b of the cassette holder 101. The cassette 5 can, therefore, be inserted smoothly in the cassette holder 101 from the direction indicated by the arrow b.

Figure 25:
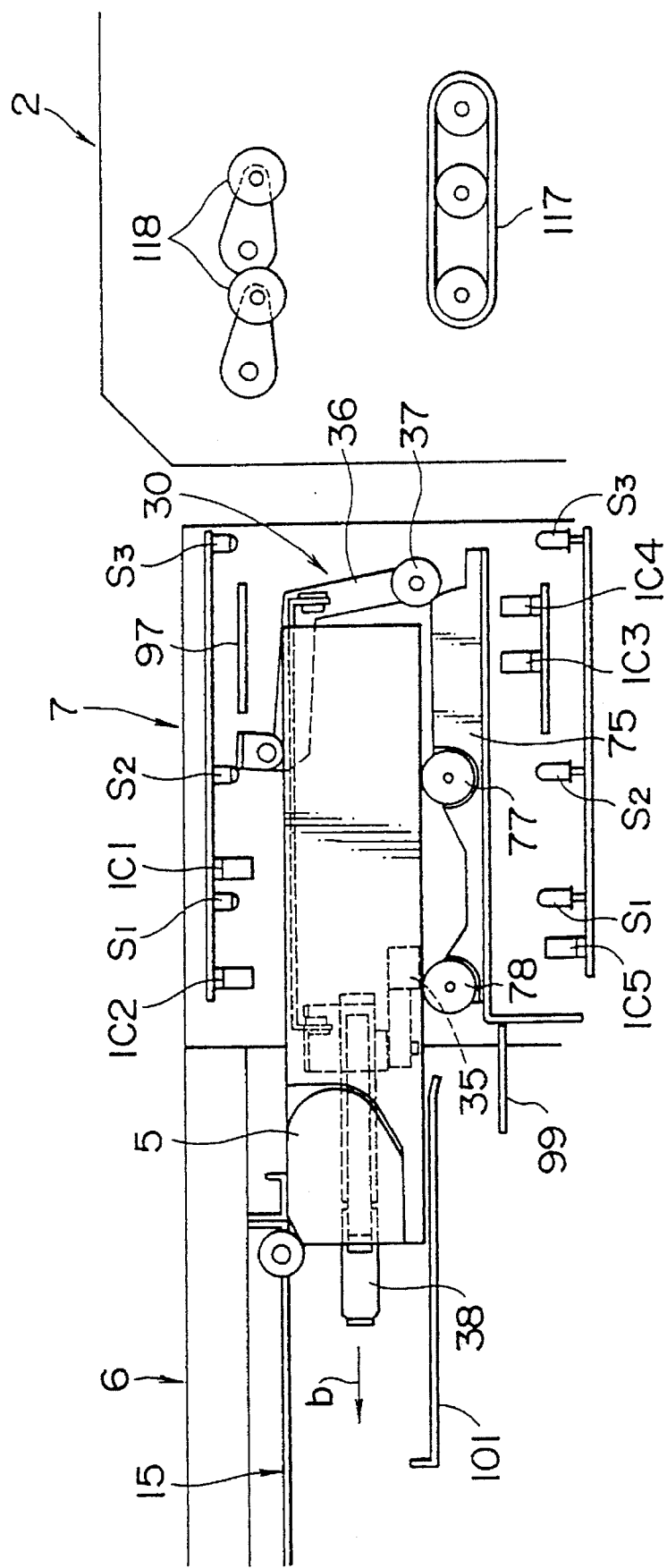
FIG. 25 is a side view, with parts cutaway for clarity, showing the condition further proceeded from the condition shown in FIG. 24.

As shown in FIG. 25, when the rear end face 5b of the cassette 5 moves past the inject bar 37, the left and right drive projections 73 on the first sliders 32 shown in FIGS. 12 and 13 start to move the inject arms 36 in the direction of the arrow b via the second sliders 33.

In this instance, the left and right second cam mechanisms 74 shown in FIGS. 11 and 12 cause the inject bar 37 to ride on the flat lands 75b of the respective slide guides 75. The inject bar 37 thus projects upwardly into the cassette feed passage 30. Thus, the cassette presser rollers 70 on the inject bar 37 subsequently force the rear end face 5b of the cassette 5 in the direction of the arrow b.

As the cassette 5 advances in the direction of the arrow b from the position of FIG. 24 toward the position of FIG. 25, the cassette sensor $S_1$ is closed or activated by the cassette 5.

Figure 26:
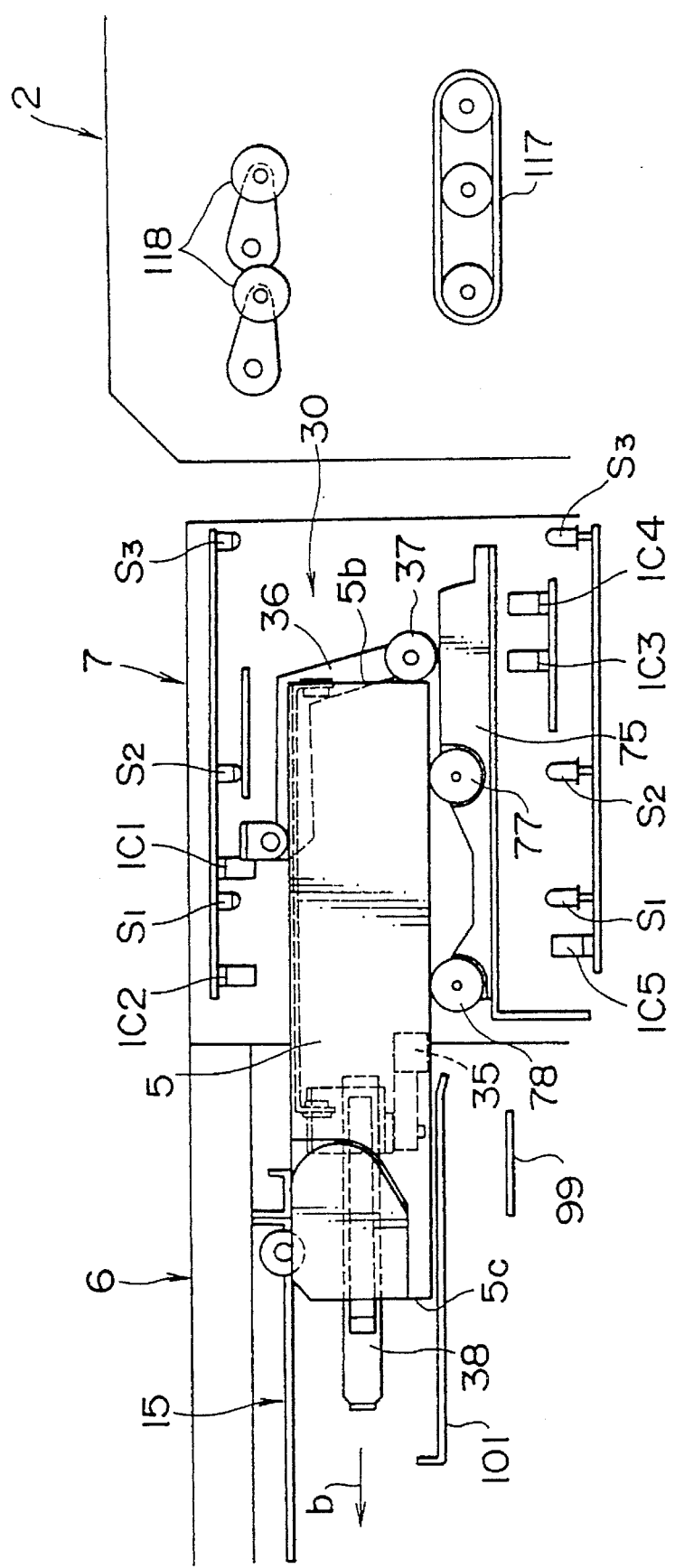
FIG. 26 is a side view, with parts cutaway for clarity, showing the condition further proceeded from the condition shown in FIG. 25.

When the rear end face 5b of the cassette 5 is forced in the direction of the arrow b by the cassette presser rollers 70 on the inject bar 37, as shown in FIG. 26, the first cam mechanisms 61 displace the left and right side arms 36 laterally away from one another and retract them laterally outwardly from the cassette feed passage 30. Thus, the left and right side surfaces 5a of the cassette 5 are released from the side arms 35.

Figure 27:
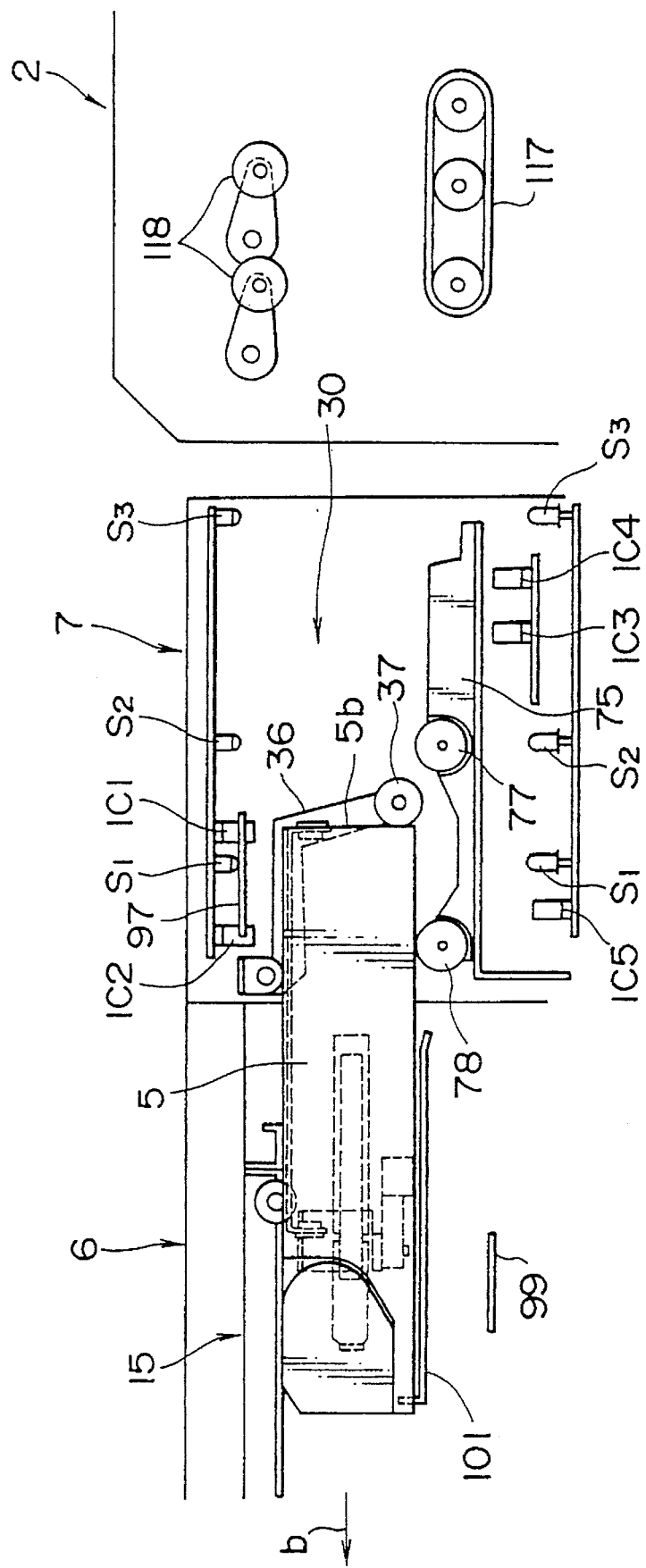
FIG. 27 is a side view, with parts cutaway for clarity, showing the condition in which the cassette injecting operation is finished.
Figure 35:
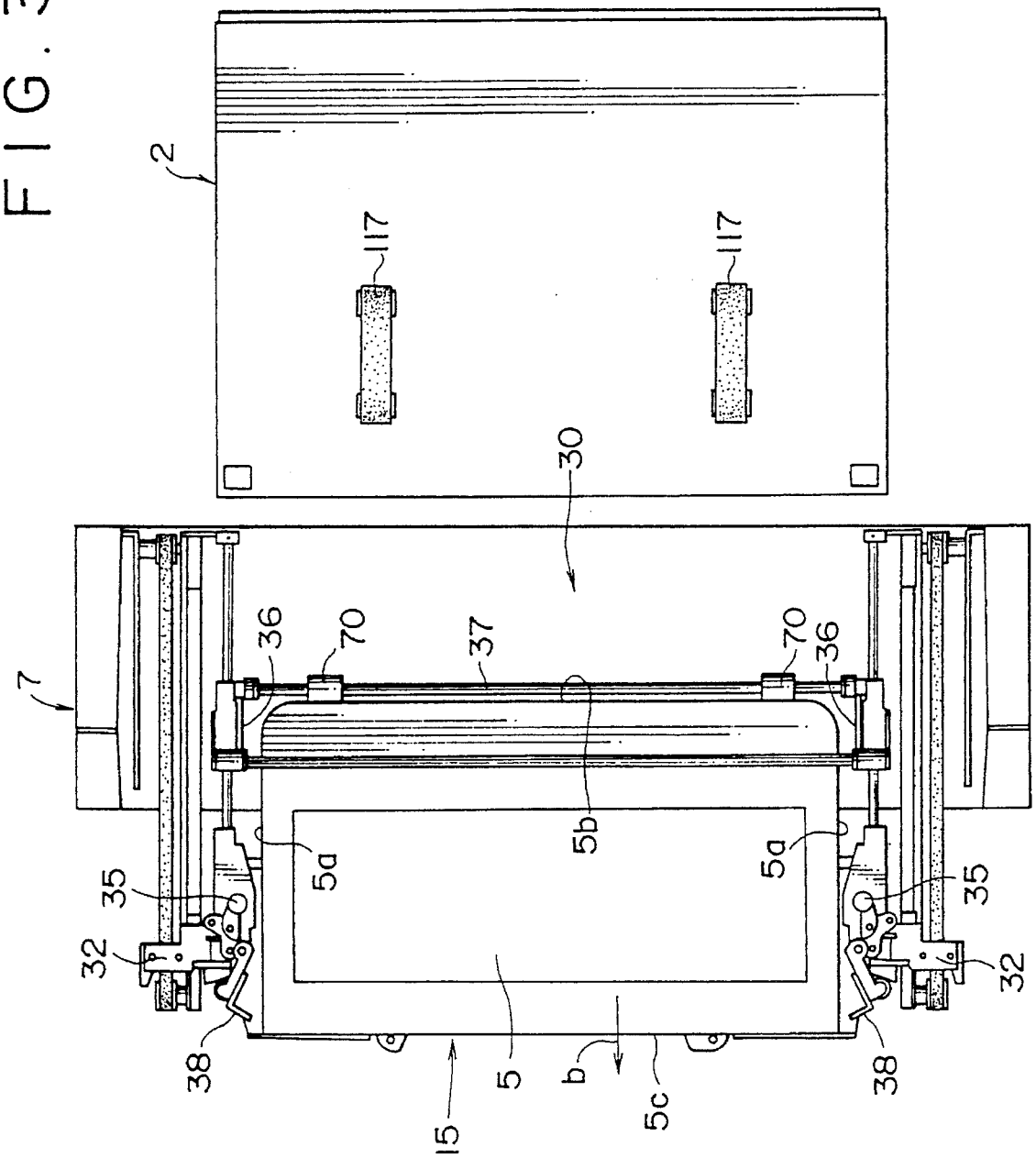
FIG. 35 is a plan view, with parts cutaway for clarity, of FIG. 27.

Subsequent to the condition shown in FIG. 26, the cassette 5 can be positively and reliably fed into the cassette holder 101 merely by forcing the rear end face 5b of the cassette 5 in the direction of the arrow b by the cassette presser rollers 70 on the inject bar 37, as shown in FIGS. 27 and 35. The cassette 5 inserted in the cassette holder 101 is stably held therein as it is forced downwardly against the bottom plate 101b of the cassette holder 101 by means of the cassette presser roller 101.

Due to the presence of the cassette presser roller 101, insertion of the cassette 5 into the cassette holder 101 requires a relatively large force or pressure which is sufficient to overcome a downward force or pressure exerted from the cassette presser roller 101 on the cassette 5. However, the inject bar 37, and more particularly the cassette presser rollers 70 on the inject bar 37 are able to force the rear end face 5b of the cassette 5 positively and reliably in the direction of the arrow b, the cassette 5 can be stably and reliably inserted into the cassette holder 101.

The cassette 5, as it is inserted into the cassette holder 101 by the cassette presser rollers 70 acting on the rear end face 5b of the cassette 5, is able to slide on the four guide rollers 77, 78 in the direction of the arrow b. Accordingly, the left and right side surfaces 5a and the top and bottom surfaces of the cassette 5 are not subjected to undue force or presser. Thus, the cassette 5 is completely free from damage and does not produce ground plastic particles due to abrasion. In addition, since the inject bar 37 is able to produce a force acting on the rear end face 5b in the direction parallel to the direction of the arrow b, the cassette 5 being advanced does not turn or tilt in the horizontal plane. The cassette 5 can, therefore, be stably and reliably inserted into the cassette holder 101.

In the course of the cassette inject operation described above, the actuating pins 82 on the respective first sliders 32 shown in FIGS. 14 and 15 act on the corresponding third sliders 34 to simultaneously move the eject arms 38 in the direction of the arrow b, with the eject arms 38 disposed in front of the cassette 5.

When the inject bar 37 begins to force the rear end face 5b of the cassette 5 in the direction of the arrow b, as shown in FIG. 26, the left and right eject arms 38 are retracted laterally outwardly from the cassette feed passage 30, as shown in FIGS. 27 and 35, by means of the third cam mechanisms 90 shown in FIGS. 14 and 15.

Accordingly, as shown in FIG. 35, the cassette 5 can be smoothly inserted into the cassette holder 101 without interference with the eject arms 38.

The cassette inject operation which is achieved by the adapter 7 to insert the cassette 5 into the cassette holder 101 is thus completed. The cassette 5 thus injected is detected by a cassette-in switch (not shown) provided on the cassette holder 101.

Figure 28:
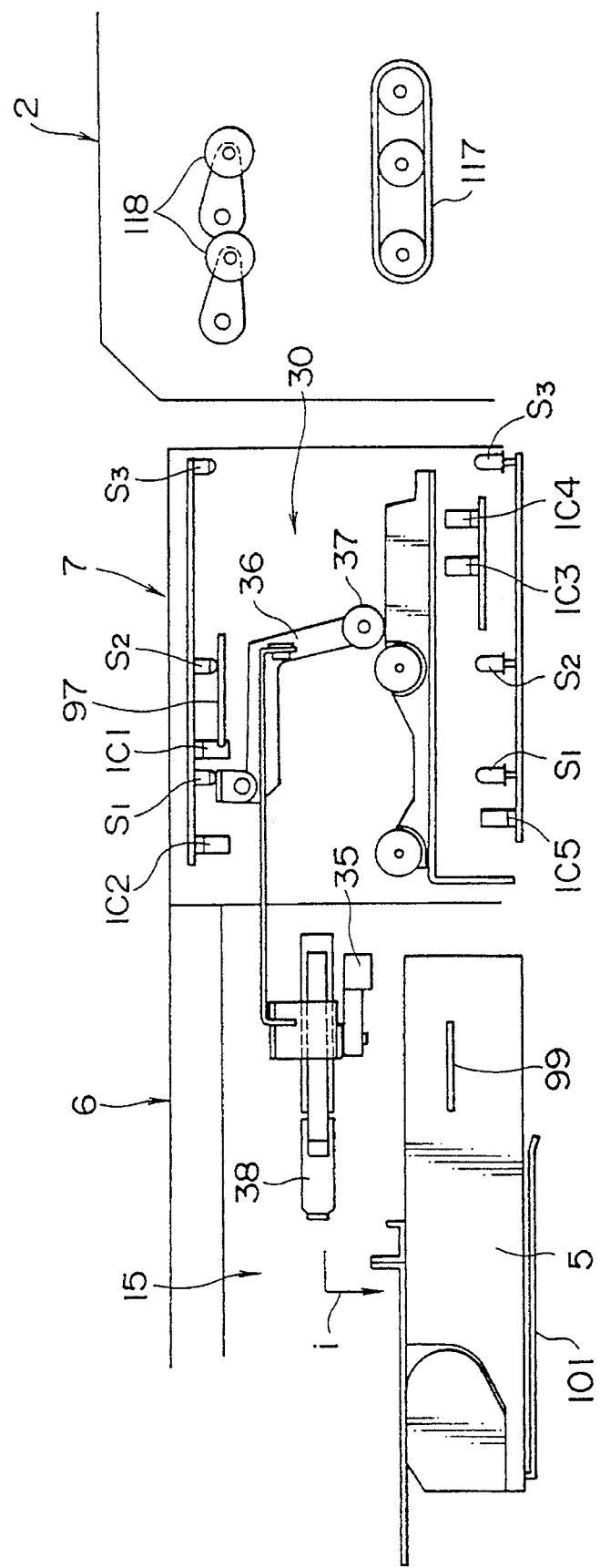
FIG. 28 is a side view, with parts cutaway for clarity, showing the cassette as it is loaded in the cassette compartment.

Upon detection of the injected cassette 5, the cassette compartment 15 is driven to lower the cassette holder 101 in the direction of the arrow i from the cassette inserting position ("up" position) shown in FIG. 27 to the cassette loading position ("down" position) shown in FIG. 28. With the cassette 5 thus loaded in the cassette loading position, the DIR 6 is driven to record and/or reproduce the loaded cassette 5.

When the cassette holder 101 is lowered to the cassette loading position, the up-down sensor $IC_5$ is opened or deactivated, as shown in FIG. 19. Based on the output from the up-down sensor $IC_5$, the "down" state or condition of the cassette holder 101 is determined by the software of a control system associated with the adapter 6.

As the cassette 5 moves in the directions of the arrows b and i, as shown in FIGS. 25–28, the cassette sensors $S_3$, $S_2$ and $S_1$ in the adapter 7 are successively opened or deactivated. When the cassette sensor $S_1$ is opened, the end or completion of the cassette inject operation, that is, the cassette 5 fully inserted in the cassette holder 101 is detected.

As shown in FIG. 27, when the shutter plate 97 closes or activates the inject finish sensor $IC_2$, the motor 46 shown in FIG. 8 is stopped. Subsequently, the motor 46 is rotated again in the reverse direction to move the first sliders 32 in the direction of the arrow b' by a short distance. The reverse rotation of the motor 46 is stopped when the shutter plate 97 opens or deactivates the eject standby sensor $IC_1$ which in turn sets the cassette transfer mechanism 31 in the eject standby condition.

Eject Operation Of Adapter

Operation achieved to eject the cassette 5 from the adapter 7 into the elevator 2 will be described below with reference to FIGS. 29–32 and FIGS. 36 and 37.

Figure 29:
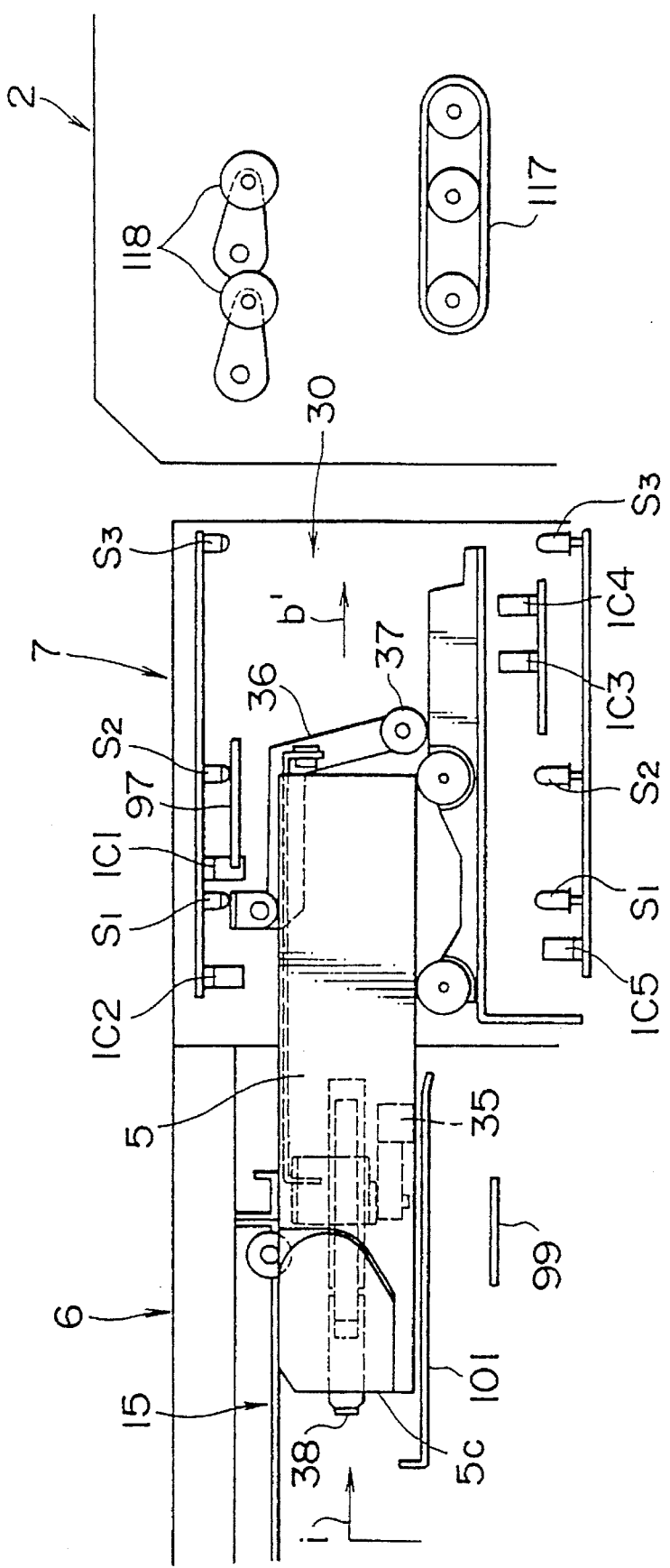
FIG. 29 is a side view, with parts cutaway for clarity, showing the condition in which the cassette starts being ejected from the cassette compartment in the cassette autochanger through the adapter into the elevator.
Figure 36:
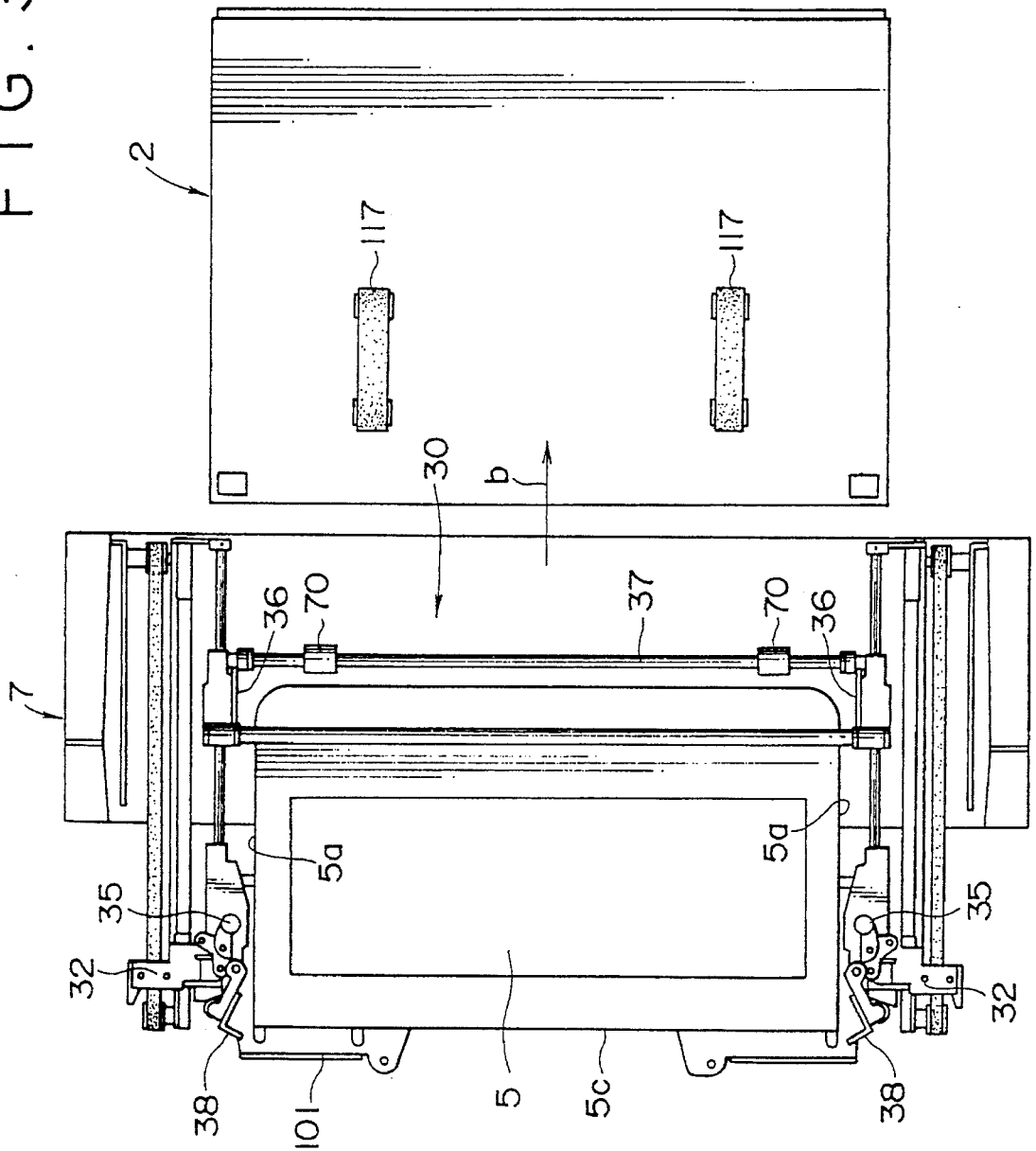
FIG. 36 is a plan view, with parts cutaway for clarity, of FIG. 29.

At first, the cassette holder 101 in the cassette compartment 15 of the DIR 6 is raised in the direction of the arrow i' from the cassette loading position ("down" position) to the cassette inserting position ("up" position), as shown in FIGS. 29 and 36. Subsequently, the cassette 5 in the cassette holder 101 is forced out in the direction of the arrow b' into the cassette feed passage 30 by means of a cassette discharge mechanism (not shown) associated with the cassette compartment 15.

When the cassette holder 101 arrives at its cassette inserting position ("up" position), the up-down sensor $IC_5$ is closed or activated. Based on the output from the up-down sensor $IC_5$, the "up" state or condition of the cassette holder 101 is determined by the software of the control system associated with the adapter 6.

The cassette 5 which is displaced from the cassette holder 101 into the cassette feed passage 30 closes the cassette sensor S1, and after that the cassette 5 is further forced out in the direction of arrow b' until its arrival at a position where the cassette 5 closes the subsequent cassette sensor $S_2$.

The cassette sensor $S_2$, when closed, acts as a start trigger to cause the left and right first sliders 32 to simultaneously start moving in the direction of the arrow b' and in the reverse order of the cassette inject operation.

Figure 30:
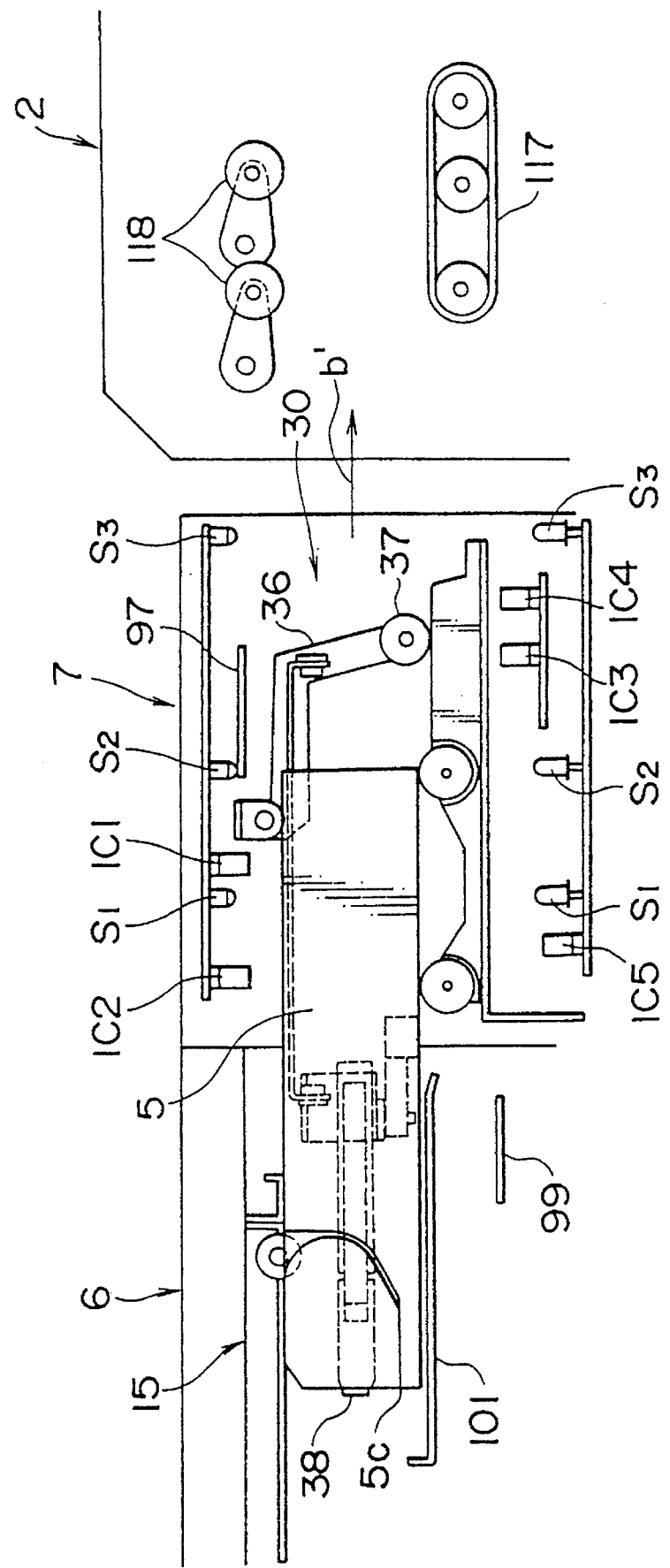
FIG. 30 is a side view, with parts cutaway for clarity, showing the condition in which the cassette ejecting operation proceeds to from the condition shown in FIG. 29.
Figure 37:
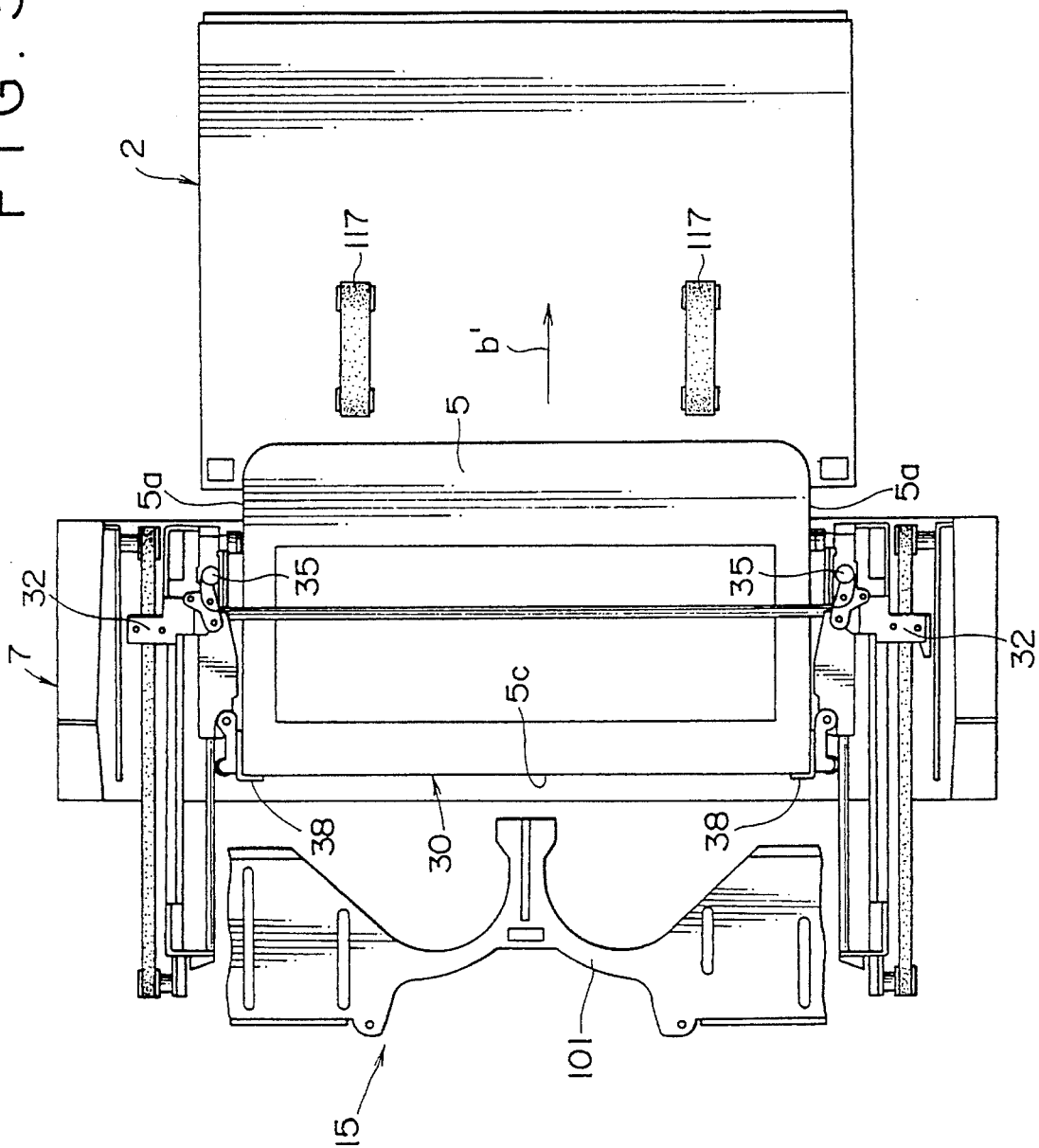
FIG. 37 is a plan view, with parts cutaway for clarity, of FIG. 32.

As shown in FIGS. 30 and 37, the left and right eject arms 38 first project into the cassette feed passage 30 and then simultaneously force left and right end portions of the front end face 5c of the cassette 5 in the direction of the arrow b'.

The cassette 5 is withdrawn from the cassette holder 101 and subsequently pulled in the direction of the arrow b along the cassette feed passage 30 by means of the eject arms 38.

Figure 31:
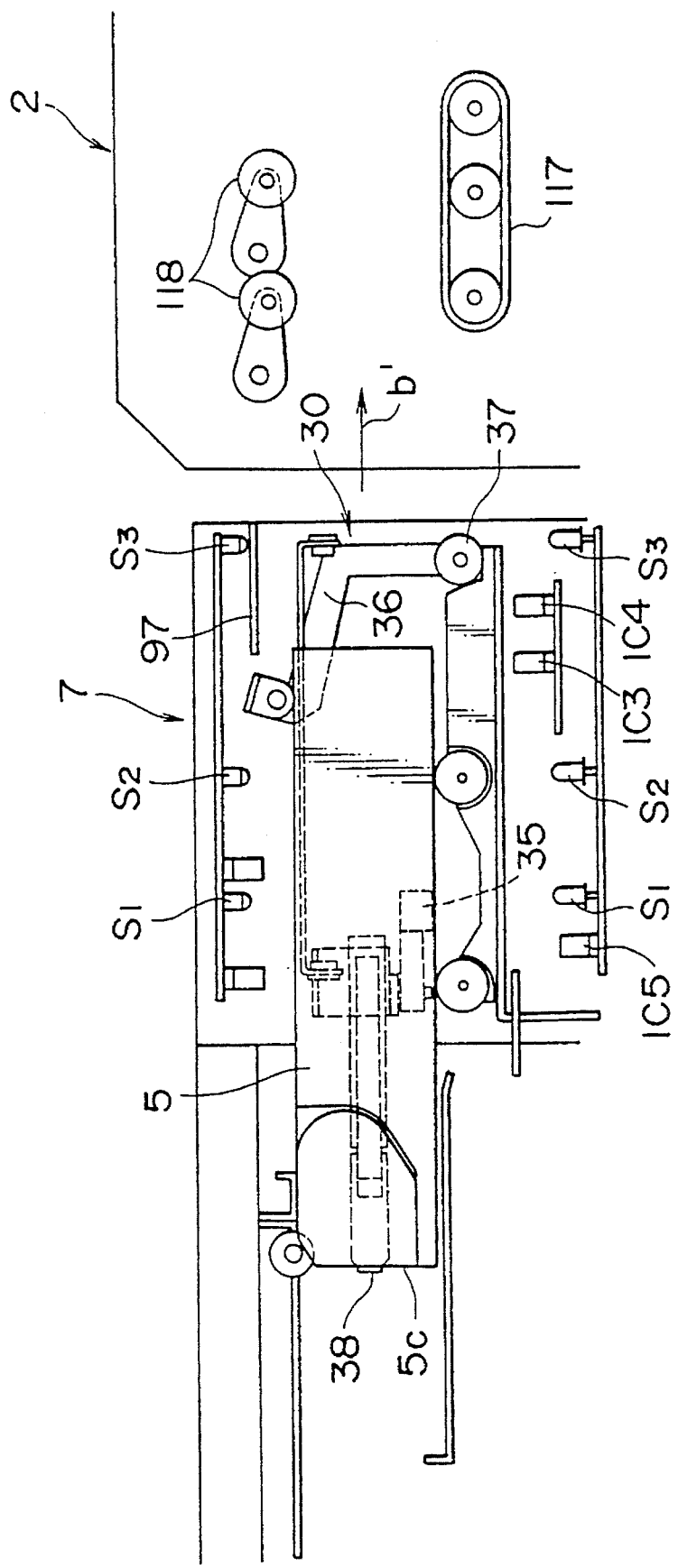
FIG. 31 is a side view, with parts cutaway for clarity, showing the condition further proceeded from the condition shown in FIG. 30.
Figure 34:
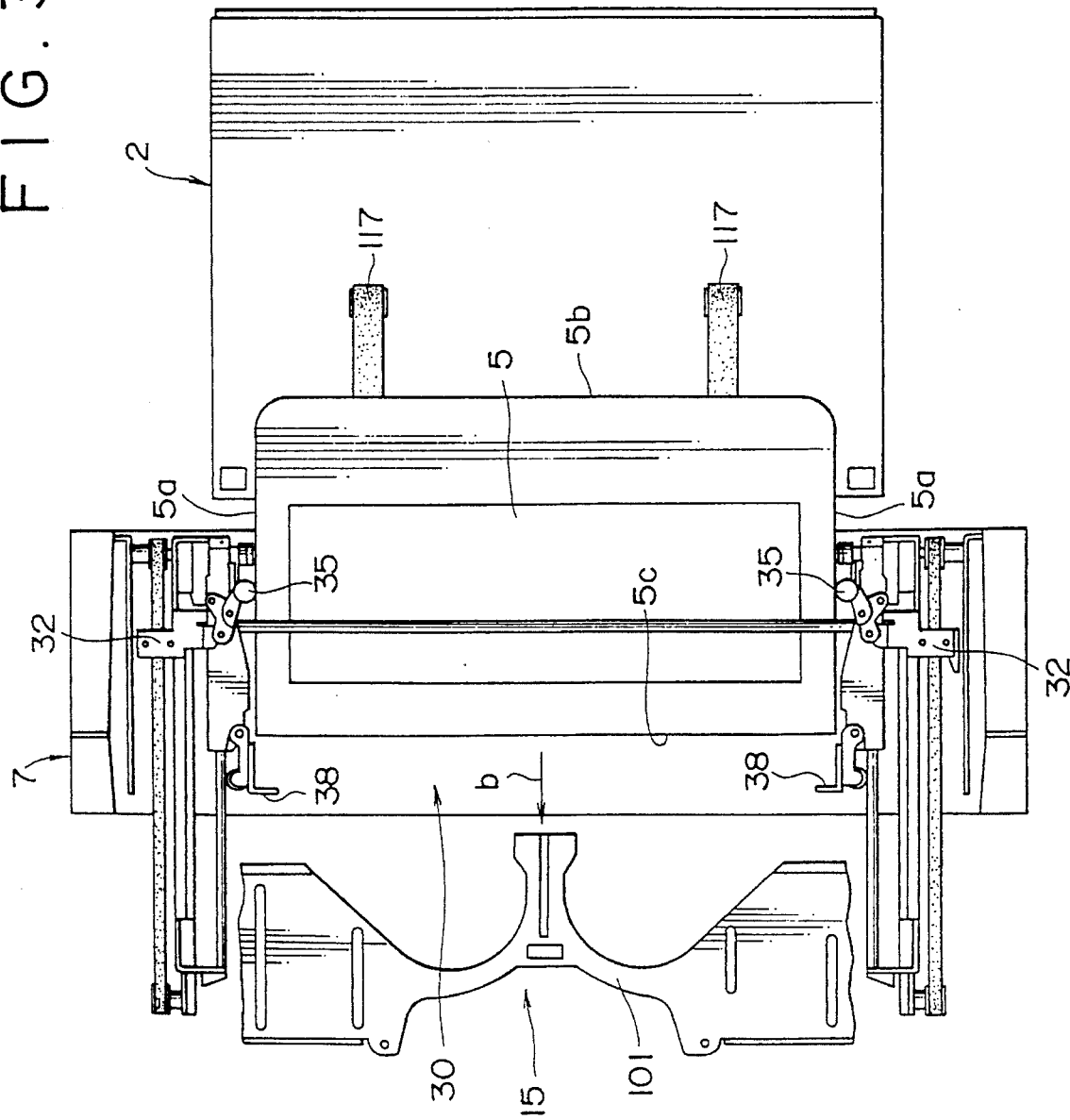
FIG. 34 is a plan view, with parts cutaway for clarity, of FIG. 26.

The left and right side arms 35, the left and right inject arms 36 and the inject bar 37 are all moved in the direction of the arrow b' together with the first sliders 32. The backward movement of the first sliders 32 causes the inject bar 37 to retract downwardly from the cassette feed passage 30, as shown in FIG. 31. Substantially at the same time, the side arms 35 shown in FIG. 34 are brought into contact with the left and right side surfaces 5a of the cassette 5 to keep the cassette 5 in alignment with a longitudinal center line of the cassette feed passage 30 while the cassette 5 is ejected.

Then, the cassette 5, as it is ejected by the eject arms 38 in the direction of the arrow b', moves over and across the inject bar 37 and then is inserted into the elevator 2, as shown in FIGS. 31 and 37. At this moment, the side arms 35 are separated laterally away from the left and right side surfaces 5a of the cassette 5.

During the cassette eject operation, the left and right eject arms 38 are able to continuously force the left and right end portions of the front end face 5c of the cassette 5 in the direction of the arrow b'. It is, therefore, possible to force the cassette 5 stably and reliably between the transfer belts 117 and the cassette presser rollers 118 while keeping the cassette 5 from turning or tilting in the horizontal plane. The cassette 5 while being ejected is completely free from undue force or pressure except a force acting in the direction of the arrow b'.

Figure 32:
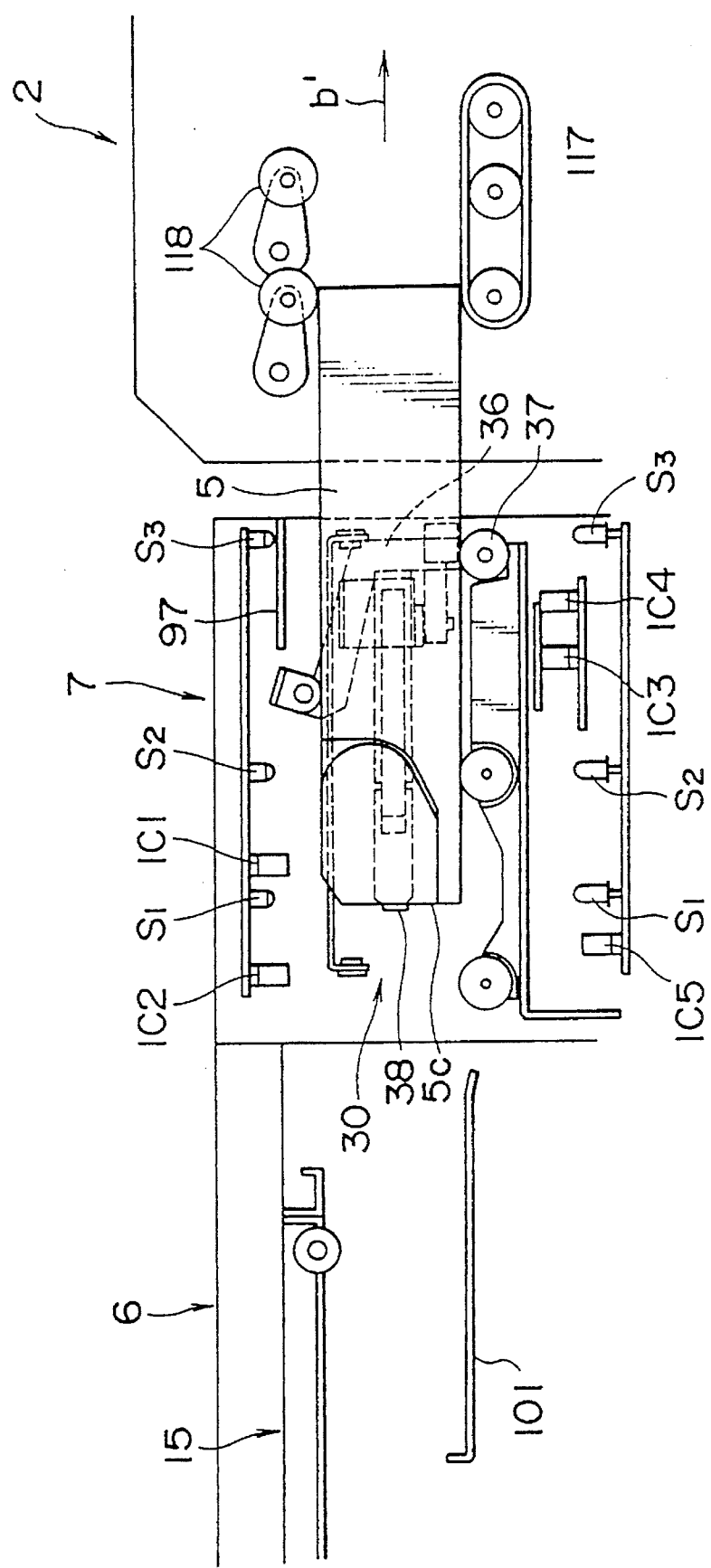
FIG. 32 is a side view, with parts cutaway for clarity, showing the condition in which the cassette ejecting operation is finished.

The cassette 5 inserted from the direction of the arrow b' into the elevator 2 closes the protruding cassette sensor $S_4$ which in turn triggers or activates the transfer belts 117 to rotate in the clockwise direction in FIG. 32. Accordingly, the cassette 5 forced between the transfer belts 117 and the cassette presser rollers 118 is drawn in the direction of the arrow b' until it arrives at a position in the elevator 2 shown in FIGS. 22 and 33.

As the cassette eject operation proceeds, the cassette sensors $S_1$, $S_2$ and $S_3$ are successively closed and thereafter successively opened. When the cassette 5 is fully ejected into the elevator 2, the cassette sensor $S_3$ is opened. Accordingly, the end or completion of the cassette eject operation can be detected when the cassette sensor $S_3$ is opened.

As shown in FIG. 32, when the shutter plate 99 closes or activates the eject finish sensor $IC_4$, the motor 46 shown in FIG. 8 is stopped. Thereafter, the motor 46 is rotated again in the forward direction to move the first sliders 32 in the direction of the arrow b for a short distance. This forward movement of the first sliders 32 causes the shutter plate 99 to open the inject standby sensor $IC_3$ which in turn stops the motor 46 and sets the cassette transfer mechanism 31 in the inject standby condition.

Cassette Double Insertion Preventing Mechanism

A cassette double insertion preventing mechanism that prevents double insertion of the cassette 5 into the cassette compartment 15 will be describe below with reference to FIGS. 18, 19, 23–32 and 40–42.

Construction Of Cassette Double Insertion Preventing Mechanism

The cassette double insertion preventing mechanism, as shown in FIGS. 23 through 32, is composed of the cassette sensors $S_1$, $S_2$ and $S_3$ disposed in the adapter 7 for detecting information about the position of the cassette 5 when the cassette 5 is injected and ejected, and the up-down sensor $IC_5$ disposed in the adapter 7 for detecting information about the up-down condition of the cassette holder 101 in the cassette compartment 15 of the DIR 6.

Operation Of Cassette Double Insertion Preventing Mechanism

Figures 40A, 40B:
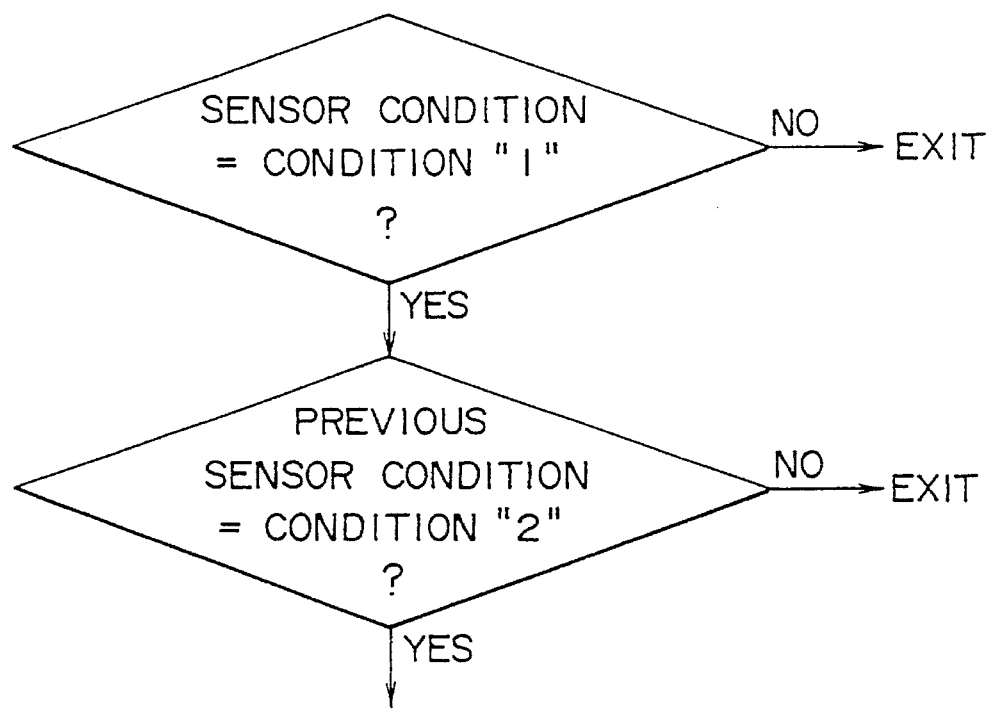
FIG. 40(A) is a table showing the relation between the operation of cassette sensors and successive stages of cassette injecting operation of the adapter of the cassette autochanger.
FIG. 40(B) is a flowchart showing the manner in which the stage of the cassette injecting operation is determined.

When a cassette 5 is injected from the adapter 7 into the cassette holder 101 in the cassette compartment 15, the cassette sensors $S_1$–$S_3$ take two states or conditions as the time goes on, that is, a first condition shown in FIG. 24 in which all the cassette sensors $S_1$–$S_3$ are closed, and a second state or condition shown in FIG. 25 in which the cassette sensors $S_1$ and $S_2$ are closed and the cassette sensor $S_3$ is opened. These conditions are also illustrated in tables shown in FIGS. 40(A) and 41(A). In FIGS. 40(A) and 40(B), the axis of ordinates of each table indicates successive stages of cassette inject operation appearing as the time goes on, while the axis of abscissas indicates the states or conditions of the individual cassette sensors $S_1$, $S_2$, $S_3$. The numeral "1" in the table represents the closed condition of each cassette sensor $S_1$, $S_2$, $S_3$.

The foregoing changes of conditions are judged by a control system of the adapter 7 according to software in which the condition "1" and the condition "2" shown in FIG. 40 are prescribed as occurring in the order named, as shown in FIG. 40(B). Owing to this judgment, at the end of a sequence of cassette inject operations it is possible to obtain a record that the cassette 5 has been injected into the cassette compartment 15 in the DIR 6. Accordingly, based on this record, we can obtain an inject inhibiting software which is capable of judging whether or not the cassette 5 is present in the cassette compartment 15.

On the other hand, the up-down condition of the cassette holder 101 in the cassette compartment 15 can be determined by the up-down sensor $IC_5$, as shown in FIGS. 18 and 19.

Figure 42:
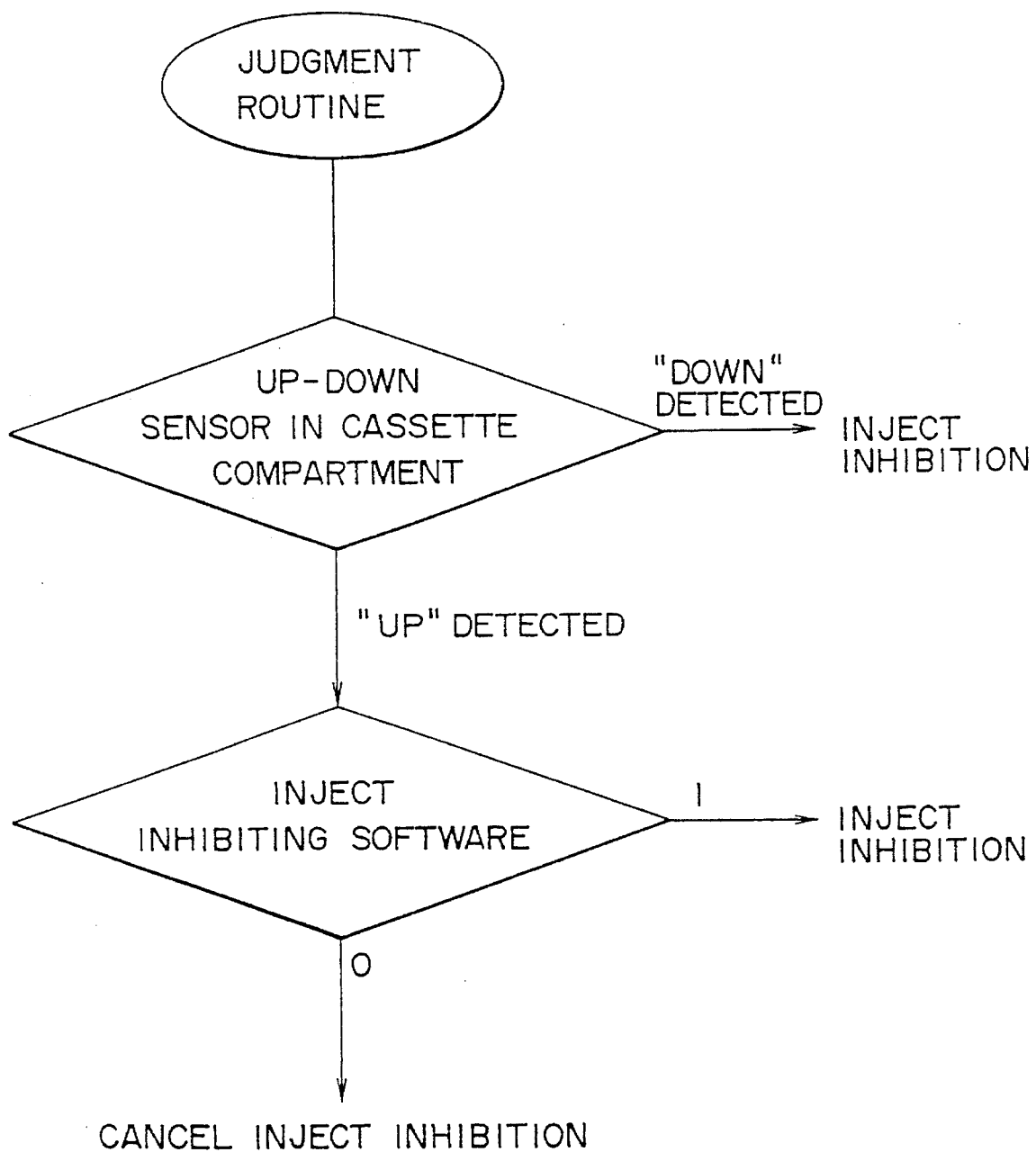
FIG. 42 is a flowchart showing a judgment routine of a cassette double insertion mechanism in the cassette compartment of the cassette autochanger.

Information about up-down condition of the cassette holder 101 obtained from the up-down sensor $IC_5$ in the cassette compartment 15 and the inject inhibiting software obtained from the cassette sensors $S_1$–$S_3$ are judged respectively to determine whether or not the cassette 5 is present in the cassette compartment 15. Both judgment results are combined with each other in a manner like an OR circuit such as shown in FIG. 42. With the judgments thus performed, it is possible to prevent the cassette 5 from being inserted from the adapter 7 into the DIR 6 in despite of the presence of another cassette 5 in the DIR 6.

Figures 41A, 41B:
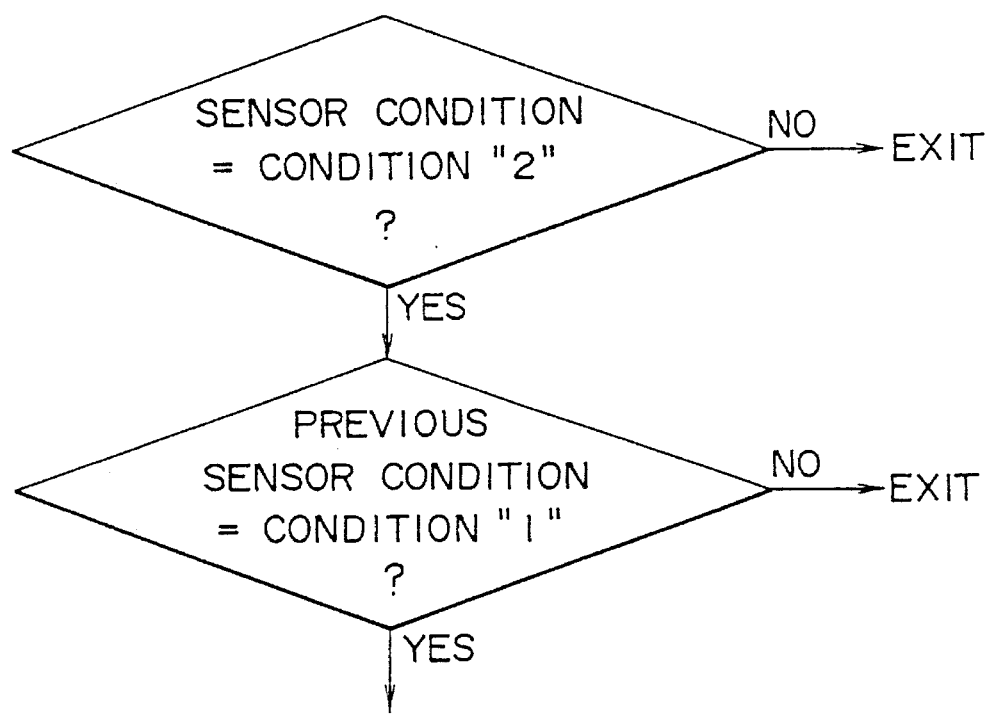
FIG. 41(A) is a table showing the relation between the operation of cassette sensors and successive stages of cassette ejecting operation of the adapter of the cassette autochanger.
FIG. 41(B) is a flowchart showing the manner in which the stage of the cassette ejecting operation is determined.

When the cassette 5 is ejected from cassette holder 101 of the DIR 6 into the adapter 7, the cassette sensors $S_1$–$S_3$ take two states or conditions as the time goes on, that is, a first condition shown in FIG. 31 in which all the cassette sensors $S_1$–$S_3$ are closed, and a second state or condition shown in FIG. 32 in which the cassette sensor $S_1$ is opened and the cassette sensors $S_2$, $S_3$ are closed. As shown in FIGS. 41(A) and 41(B), based on the change in condition of the cassette sensors $S_1$–$S_3$, it is possible to obtain a record that the cassette 5 has been ejected from the cassette compartment 15. Accordingly, based on this record, we can obtain an inject inhibiting software which is capable of judging whether or not the cassette 5 is present in the cassette compartment 15.

On the other hand, the up-down condition of the cassette holder 101 in the cassette compartment 15 can be determined by the up-down sensor $IC_5$, as shown in FIGS. 18 and 19.

The cassette double insertion preventing mechanism includes an OR judgment which is achieved by software in a control system of the cassette autochanger as an insurance function to recover a situation where either of the up-down information obtained from the up-down sensor $IC_5$ and the inject inhibiting software obtained from the cassette sensors $S_1$–$S_3$ is not available due to a failure.

According to the cassette double insertion preventing mechanism, the presence of the cassette 5 in the DIR 6 can be judged by the software achieved in the control system of the cassette autochanger without relying on a direct communication with the DIR 6. Thus, an accidental double insertion of the cassette 5 into the cassette compartment 15 can be avoided with the result that the cassette autochanger is highly safe in operation. The cassette autochanger is completely free from an accident, such as double insertion of the cassette 5, which would otherwise occur during the development of a host application software.

Although only one embodiment of the present invention has been disclosed and described, various minor changes and modifications of the present invention are possible in the light of the above teaching. For instance, the disclosed data recorder autochanger may be replaced with a cassette autochanger having various recording mediums such as a magnetic tape and a disk. It is therefore to be understood that within the scope of the appended claims the invention may be practiced otherwise than as specifically described.

What is claimed is:

1. A cassette autochanger for automatically supplying and selectively reproducing a plurality of cassettes having signals recorded on recording mediums thereof, said cassette autochanger comprising:

a plurality of storage portions each storing therein one of the cassettes;

a plurality of recording and/or reproducing apparatuses;

a transfer machine for selectively transferring the cassettes between said storage portions and said recording and/or reproducing apparatuses, said transfer machine having a transfer mechanism for feeding out the cassettes to said recording and/or reproducing apparatuses; and control means for controlling the operation of said transfer mechanism so that in a normal condition, the cassettes are fed at a first speed, and when a power failure occurs after the feeding of the cassettes is started, the cassettes are thereafter fed at a second speed higher than said first speed.

2. A cassette autochanger according to claim 1, wherein said control means includes means for detecting the occurrence of a power failure.

3. A cassette autochanger according to claim 2, further including a sensor for detecting the arrival of the cassettes at a predetermined position when the cassette are fed toward said recording and/or reproducing apparatuses by said transfer machine, wherein said control means controls the operation of said transfer mechanism such that the cassettes are fed toward said recording and/or reproducing apparatuses at said second speed when a power failure is detected by said detecting means after a detected output from said sensor is obtained.

4. A cassette autochanger according to claim 3, wherein said sensor comprises a sensor capable of detecting the cassette when the cassette protrudes from a surface of said transfer machine confronting to said recording and/or reproducing apparatuses.

5. A cassette autochanger according to claim 3, wherein said transfer mechanism of said transfer machine includes an endless conveyor belt and a motor for running said conveyor belt, and said control means controls the speed of rotation of said motor.

6. A cassette autochanger according to claim 5, wherein said transfer mechanism of said transfer machine further includes a presser roller for forcing the cassette against said conveyor belt.

* * * * *